United States Patent [19]

Huber

[11] Patent Number: 4,888,690
[45] Date of Patent: Dec. 19, 1989

[54] INTERACTIVE ERROR HANDLING MEANS IN DATABASE MANAGEMENT

[75] Inventor: Val J. Huber, Chelmsford, Mass.

[73] Assignee: Wang Laboratories, Inc., Lowell, Mass.

[21] Appl. No.: 171,231

[22] Filed: Mar. 21, 1988

Related U.S. Application Data

[63] Continuation of Ser. No. 40,706, Apr. 17, 1987, abandoned, which is a continuation of Ser. No. 690,800, Jan. 11, 1985, abandoned.

[51] Int. Cl.⁴ .................. G06F 15/40; G06F 15/04
[52] U.S. Cl. .................... 364/200; 364/300; 364/282.1; 364/283.4; 364/236.8; 364/286

[56] References Cited

U.S. PATENT DOCUMENTS

| | | | |
|---|---|---|---|
| 4,068,298 | 1/1978 | Dechant et al. | 364/200 |
| 4,141,078 | 2/1979 | Bridges, Jr. et al. | 364/900 |
| 4,186,438 | 1/1980 | Benson et al. | 364/200 |
| 4,384,325 | 5/1983 | Slechta, Jr. et al. | 364/200 |
| 4,422,158 | 12/1983 | Galie | 364/900 |
| 4,468,728 | 8/1984 | Wang | 364/200 |
| 4,476,528 | 10/1984 | Matsumoto et al. | 364/200 |
| 4,479,196 | 10/1984 | Ferrer et al. | 364/900 |
| 4,497,039 | 1/1985 | Kitakami et al. | 364/900 |
| 4,498,145 | 2/1985 | Baker et al. | 364/900 |
| 4,506,326 | 3/1985 | Shaw et al. | 364/300 |
| 4,514,826 | 4/1985 | Iwata et al. | 364/900 |
| 4,543,630 | 9/1985 | Neches | 364/200 |
| 4,570,217 | 2/1986 | Allen et al. | 364/9004 |
| 4,611,298 | 9/1986 | Schuldt | 364/900 |
| 4,613,946 | 9/1986 | Forman | 364/3004 |
| 4,631,664 | 2/1980 | Bachman | 364/200 |
| 4,631,673 | 12/1986 | Haas et al. | 364/300 |
| 4,642,762 | 2/1987 | Fisanick | 364/300 |
| 4,644,471 | 2/1987 | Kojima et al. | 364/300 |
| 4,648,044 | 3/1987 | Hardy et al. | 364/300 |

OTHER PUBLICATIONS

L. A. Rowe et al. "A Form Application Development System", Proceedings of the International Conference on Management of Data, Jun. 1982, pp. 28-38.
D. D. Chamberlin et al. "Support for Repetitive Transactions ad Hoc queries in System R", A.C.M. Transactions on Database Systems, vol. 6, No. 1, Mar. 1981, pp. 70-94.
D. R. Ries et al. "An Architecture For a Database Centered Office System (DACOS)" pp. 446, 447.
Journal of Telecommunication Networks, vol. 2 No. 4, 1983, pp. 445-461 C. W. Kaurman et al., "The DACOS Forms-based Query System", Journal of Telecommunication Networks, vol. 2, No. 4, 1983 pp. 463-482.C
MacIntosh Manual, Apple Computer Inc., USA, 1984 p. 59.

Primary Examiner—Gareth D. Shaw
Assistant Examiner—Kevin A. Kriess
Attorney, Agent, or Firm—Michael H. Shanahan; Gordon E. Nelson

[57] ABSTRACT

In a relational database management system, errors can be corrected by an interactive user so that noninteractive operation can continue. A fetch module operates against a cursor to retrieve a record occurrence noninteractively for a selected operation. The selected operation is validated; an error condition can be set. When the selected operation is valid, the operation is performed, and a return signal is provided, causing the fetch module to retrieve the next record occurrence. When the selected operation is invalid, the fetch module responds to the error condition by operating interactively to display the previously retrieved record occurrence with an error message.

19 Claims, 28 Drawing Sheets

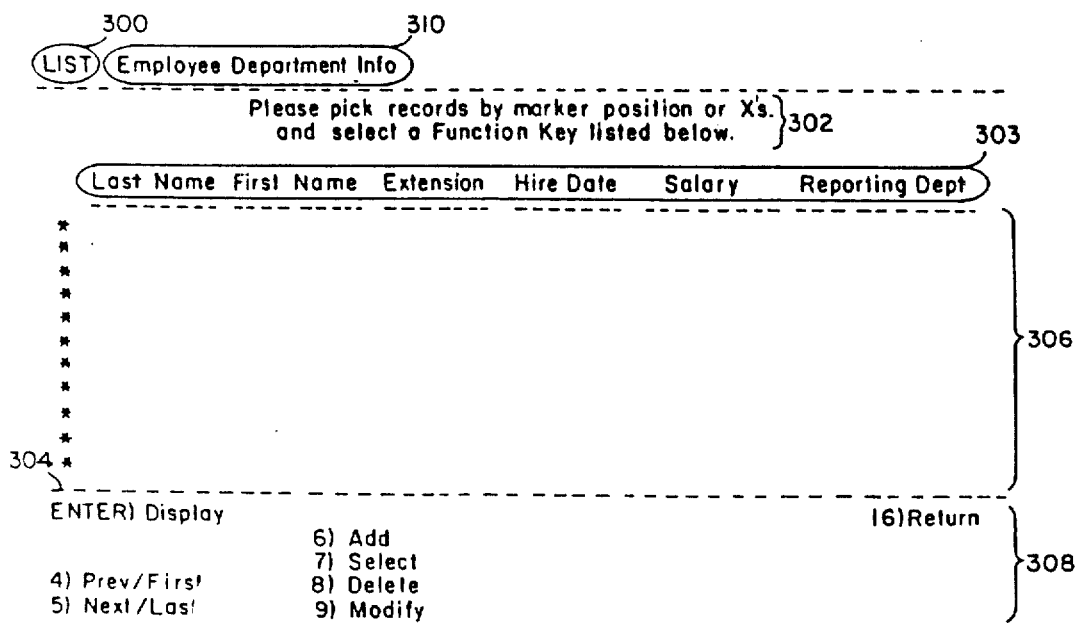

FIG. 7a

```
LIST Employee Department Info
- - - - - - - - - - - - - - - - - - - - - - - - - - - - - - - -
          Please pick records by marker position or X's,
             and select a Function Key listed below.

Last Name  First Name  Extension  Hire Date  Salary     Reporting Dept
     ---------  ----------  ---------  ---------  --------   --------------
   * HORNE      GLENN •     4400       02/22/77   25,250.00  MIDWEST
   * HUBER      JANET       6000       12/07/76   45,750.00  NORTHEAST
   * JACOBER    LEVI        7500       04/13/84   37,000.00  INTERNATIONAL
   * KANE       JOHN        7600       06/25/84   22,150.00  PACIFIC
   * KAPLAN     DENNY       2000       12/18/77   27,000.00  EUROPEAN
   * KEATING    WARREN      5700       05/15/84   21,250.00  EUROPEAN
   * LYONS      PAT         1700       12/28/82   33,333.00  NORTHEAST
   * MATHEW     DOUGLAS     4300       06/15/76   74,000.00  INTERNATIONAL
   * MCKEEVER   VAL         2100       06/06/84   18,350.00  EUROPEAN
   * MCKINNEY   KATHY       5500       10/01/81   29,500.00  INTERNATIONAL
   * MORRISSEY  JIM         6600       08/29/82   17,500.00  INTERNATIONAL
- - - - - - - - - - - - - - - - - - - - - - - - - - - - - - - -
ENTER) Display
                6) Add                                      16) Return
                7) Select
4) Prev / First 8) Delete
5) Next / Last  9) Modify
```

FIG. 7b

| SCREEN LOCATION | SCREEN LENGTH | MEMORY LOCATION | LENGTH OF VARIABLE | TYPE |
|---|---|---|---|---|
| | | | | |
| | | | | |

155    174

```
DISPLAY Employee Department Info
----------------------------------------
            Please press a Function Key listed below.

Last Name:              HORNE
First Name:             GLENN
Extension:              4400
Hire Date:              02/22/77
Salary:                 25,250.00
Reporting Dept:         MIDWEST
Reporting Dept Location: CHICAGO
Reporting Dept Budget:  400,000.00
On Loan Dept:           SALES
On Loan Dept Location:  LOWELL
On Loan Dept Budget:    500,000.00

----------------------------------------------
                                                    16) Return
                6) Add 8) Delete
5) Next/Last    9) Modify
```
DISPLAY SCREEN 402

```
                    310
SELECT Employee Department Info
--------------------------------------------
   LOW- Specify Equal, Generic or Low Range values.
       Enter selection criteria and press a Function Key listed below.
                Press (7) for options.
Last Name:              ?********
First Name:             ?********
Extension:              ?***
Hire Date:              ?*******
Salary:                 ?*********
Reporting Dept:         ?**************
Reporting Dept Location: ?
Reporting Dept Budget:  ?
On Loan Dept:           ?***************
On Loan Dept Location:  ?
On Loan Dept Budget:    ?
------------------------------------------
ENTER) List      1) Clear                        16) Return
                 6) Add
3) Down          7) High-Low/Options
                 8) Delete
                 9) Modify
```
SELECT SCREEN 404

FIG. 12

```
┌─────────────────────────────────────────────────────────────────────┐
│ ADD  Employee Department Info                                       │
│ ─────────────────────────────────────────────────────────────────── │
│    Please fill in the requested Information and press (ENTER) to Add the record,
│              or press another Function Key listed below.
│
│    Last Name:              **********
│    First Name:             **********
│    Extension:              ****
│    Hire Date:              ********
│    Salary:                 0.00********
│    Reporting Dept:         ****************
│    Reporting Dept Location:
│    Reporting Dept Budget:  0.00
│    On Loan Dept:           ****************
│    On Loan Dept Location:
│    On Loan Dept Budget:    0.00
│
│ ─────────────────────────────────────────────────────────────────── │
│ ENTER) Add        7) Set Defaults                      16) Return   │
└─────────────────────────────────────────────────────────────────────┘
                  406-2                          406-1
```

```
┌─────────────────────────────────────────────────────────────────────┐
│ MODIFY Employee Department Info                                     │
│ ─────────────────────────────────────────────────────────────────── │
│   Please modify the displayed information and press (ENTER) to Modify the record,
│              or press a Function Key listed below.
│
│    Last Name:              HORNExxxxx
│    First Name:             GLENNxxxxx
│    Extension:              4400
│    Hire Date:              02/22/77
│    Salary:                 25,250.00xx
│    Reporting Dept:         MIDWESTxxxxxxxx
│    Reporting Dept Location: CHICAGO
│    Reporting Dept Budget:  400,000.00
│    On Loan Dept:           SALESxxxxxxxxxx
│    On Loan Dept Location:  LOWELL
│    On Loan Dept Budget:    500,000.00
│
│ ─────────────────────────────────────────────────────────────────── │
│ ENTER) Modify     1) Skip record                       16) Return   │
└─────────────────────────────────────────────────────────────────────┘
                              406-3
```

```
┌─────────────────────────────────────────────────────────────────────┐
│ DELETE Employee Department Info                                     │
│ ─────────────────────────────────────────────────────────────────── │
│              Please press (ENTER) to delete this record,
│              or press a Function Key listed below.
│
│    Last Name:              HORNE
│    First Name:             GLENN
│    Extension:              4400
│    Hire Date:              02/22/77
│    Salary:                 25,250.00
│    Reporting Dept:         MIDWEST
│    Reporting Dept Location: CHICAGO
│    Reporting Dept Budget:  400,000.00
│    On Loan Dept:           SALES
│    On Loan Dept Location:  LOWELL
│    On Loan Dept Budget:    500,000.00
│
│ ─────────────────────────────────────────────────────────────────── │
│ ENTER) Delete     1) Skip record                       16) Return   │
└─────────────────────────────────────────────────────────────────────┘
```

FIG. 13

PACE DATA DESCRIPTION FACILITY xx.xx.xx

PLEASE MARK ENTRY (S) AND SELECT AND PRESS A PF KEY

| TABLE | COMMENT |
|---|---|
| # Customer | Records of current customers |
| # Item | Records of items currently on order |
| # Order | Records of outstanding orders to customers |
| # Part | Records of parts in inventory |

ENTER) Fields in Table
1) Advanced Functions        6) Add        9) Modify              13) Help
                             7) Find      10) Display Table
                             8) Delete    11) Keys for Table      16) Return

FIG. 18

ADD TABLE

Please enter the information and press the appropriate PF key below:

Table Name = *****************************

Comments = *******************************************
***********************************************
*******************************************

ENTER) Add entry
1) Return                10) Pick File            16) Cancel Add 3) Down

FIG. 19

```
ADVANCED LIST PACE DATA DESCRIPTION FACILITY xx.xx.xx

PLEASE MARK ENTRY(S) AND SELECT AND PRESS A PF KEY

TABLE              COMMENT

#  Customer      Records of current customers
#  Item          Records of items currently on order
#  Order         Records of outstanding orders to customers
Part          Records of parts in inventory ENTER) Display      6) Create Relationship   9)View Relationship   13).Basic Functions
                    8) Delete Relationship                          16) Return
```

FIG. 20

INTERACTIVE ERROR HANDLING MEANS IN DATABASE MANAGEMENT

This is a continuation of co-pending application Ser. No. 07/040,706 filed on 04/17/88, now abandoned, which is a continuation of Ser. No. 06/690,800 filed on 01/11/85, now abandoned, titled INTERACTIVE ERROR HANDLING MEANS IN DATABASE MANAGEMENT, filed Jan. 11, 1985, inventor Val J. Huber and a continuation-in-part of U.S.S.N. 687,809, titled DATABASE MANAGEMENT SYSTEM, filed Dec. 31, 1984, inventor Val J. Huber.

This application is filed with a microfiche appendix comprising 9 fiche and 439 frames.

BACKGROUND OF THE INVENTION

My invention relates to the operation of data processing systems, in particular to the management of relational databases stored in the memory of such systems. The invention further relates to means to facilitate the interactive use and updating of such databases.

The invention is employed in a data processing system, having one or more terminals or consoles which provide display means and keyboard signal input means, and providing in storage physical records modeled as at least one relational database.

Among the individual ultimate users of the data processing system and database records are some users, such as clerks, who are not programmers. Such users wish to be able to use the system terminals to view displayed representations of the records stored in the data processing system memory, to select specific records or parts of records to view, to delete or modify physical records in the memory, or to add new physical records to the memory. For these purposes the physical records must be selected, accessed in the physical storage, and retrieved (copied), and representations of the retrieved records must be displayed to the user at one of the terminals in some predetermined display format.

To permit this use of the stored database records, there must be provided in the data processing system stored coded instructions which when executed by the data processing system cause representations of the physical records, as well as representations of signals input by the user through the keyboard, to be displayed in a particular format on the display. Further, there must be provided stored coded instructions which when executed by the data processing system cause the interpretation of the signals input by the user through the keyboard, and which cause the retrieval and modification of the physical records of the stored database in response to such input signals.

Such instructions, designed for a particular use of the records of a particular database, together comprise one of a class of programs known as "database applications programs", that is, programs used by the ultimate user of the data processing system to carry out the application desired by him on the stored physical records of a particular database.

The preparation of such applications programs has typically required weeks or months of effort by an applications programmer, followed by additional weeks to detect and eliminate errors in the program so that it becomes reliable and relatively error-free in use.

It is therefore desirable to provide means for simplifying the construction and operation of such database applications programs, and it is an object of my invention to provide such means.

As is well understood in the art, the user (or programmer) of a data processing system does not deal directly with the physical records stored in the system's memory. Rather, he deals with a model of such records, provided when neeeded by means of programming stored in the system's memory and executed by the processor as needed. Referring to FIG. 2, the physical records are stored on physical media, advantageously as magnetic signals stored on magnetic disks 24 comprising secondary memory 16. The magnetic signals are physically organized on disks 24 in a manner well understood in the art of managing such memory media. The particular organization of such signals, and the particular means of locating them and copying them into main memory 14, are highly dependent on the hardware aspects of the particular memory media employed.

Several models of the records are provided, having different degrees of abstraction from the underlying stored physical records. Briefly, these are (referring to FIG. 2): the "external" view (26 or 28), in which "external" or "logical" records are seen by a particular user; the "conceptual view" (30), in which "conceptual" records are seen, each external view being a subset of the conceptual view; and the "internal" view (32) in which "internal" or "stored" records are seen.

It will be recognized that, when the data processing system operates to construct and present for use the records of each view shown in FIG. 2, these records are at that time (during such use) represented within the data processing system by physical signals derived from the magnetic signals stored on disks 24. When such use is concluded, the constructed records are no longer physically represented within system 10. In contrast, the underlying physical records stored on disks 24 remain on the disks at all times, whether or not they are in use, until deleted or modified.

The signals representing the records as seen in the various views 26, 28, 30, and 32 are derived from the physical records stored on media 24 by the data processing system, by means of the operation of a database management system, in other words by the execution of a suitable stored program by processor 12. As seen in the conceptual showing of FIG. 3, the physical records on media 24 are physically written, copied, and deleted by the data processing system under the control of a program element known as an access method, in a manner well understood in the art, and forming no part of the present invention. The access method is regarded as presenting to the database management system "stored" or "internal" records corresponding to and derived from the physical records.

The "internal" view is not seen by the user of the database (although it may be known to a programmer using the system). Processor 12, operating according to other portions of the database management system program, constructs from the stored or internal records the records of the conceptual view and its subsets, the external views. The definitions of the conceptual records are independent of the storage structure or the strategy employed by the access method for efficiently locating and retrieving the physical records.

Records in a database may be related to other records in the database, and the relationship is of interest to the user of the database. The relationship is itself represented as an entity in the database.

It is well understoood in the database management art that the conceptual records of a database, and the relationships among them, may be organized or modeled in one of three possible ways, known as relational, hierarchical, and network models.

The present invention relates to the management of the records of a database modeled as a relational database.

The records of a relational database are conceptually organized as tables (also referred to as "relations". Referring to FIG. 4, a table (relation) of a relational database comprises a plurality of rows; each row is a record (or tuple) comprising a plurality of fields. All rows of a particular table have the same number of fields. The fields of the records are arranged in columns; a column is also referred to as an attribute. The elements of a column are all members of a class of such elements, referred to as a domain, and the column is named by a column heading (domain name). Each record includes one or more fields whose content is an index or key, to be used in uniquely identifying the record.

A crucial feature of relational data structure is that associations between rows (tuples) are represented solely by data values in columns drawn from a common domain, rather than in terms of the physical location on disk of the related records.

Relational databases have various advantages over the two alternative models. Generally speaking, while hierarchical and network databases are organized to make it efficient to deal with one record at a time and to obtain a single related record at a time, relational databases are organized to make it efficient to deal with a set of records at a time and to obtain a set of related records at a time.

It is an important aspect of the relational model that the tables (relations), if they conform with certain constraints, may be considered as mathematical elements, also called relations, as to which a rigorous mathematical treatment already exists. Hence, operations on the tables can be analyzed in terms of this mathematical theory, an advantage in clearly understanding the effects of such operations. In particular, representing the data in the form of uniformly defined sets makes possible a corresponding uniformity in the set of operators which transform the sets, which simplifies the task of providing program elements for controlling a data processing system to transform such sets. It is an object of my invention to extend this advantage to aspects of database maintenance where it has not previously been provided, by providing an enumerated relation.

During the operations involved in maintaining a relational database, several kinds of errors can occur. Certain errors are "fatal", that is, the operation of the data processing system cannot proceed at all (for example, a permanent error in the operation of the disk). Certain other errors are not fatal, but require correction before the operation can be continued. In an interactive system, such errors can be corrected by a terminal user.

In particular, there are two levels of such errors. At the first or field level, constraints on fields (for example, that a value entered into a given field be alphabetic or numeric) are violated. At the second or integrity level, more complex constraints are violated: for example, a record may be defined in the data dictionary as a parent record in a relationship, and there may be a constraint preventing deletion of a parent record it there are records present related as child records to the parent record. If the user attempts to delete the parent record when such child records are present, this is an error. It is desirable to provide means for detecting the error.

In interactive systems, both levels of errors are within a class of errors that can be corrected by an interactive user of the system; if an indication of the error is presented on the display, the user, by means of the keyboard, can correct the error, and operation of the system can continue.

It would therefore be desirable to provide means for detecting and presenting to the interactive user errors of the class that can be interactively corrected. It is an object of my invention to provide such means.

BRIEF DESCRIPTION OF THE INVENTION

According to my invention, interactive error-handling means is provided for use in a relational database management system. The error-handling means comprises display means and input means, and further comprises storage means providing: record occurrence signals comprising record occurrences in a relational database; status signals; currency signals; format signals; and message file signals representing the characters of displayable error messages. Further, the storage means provides means defining an operation buffer and first and second record occurrence buffers.

The error-handling means further comprises calling means, operation means, and fetch means. The operation means comprises means responsive to an operation call signal for validating an operation selected to be performed with respect to record occurrence signals in the second record occurrence buffer and providing an output signal having one of two values, representing valid and invalid conditions. The operation means further comprises first means responsive to an invalid condition value of the output signal for generating corresponding status invalid signals, and providing an operation return signal; and second means responsive to a valid condition value of the output signal for performing the selected operation with respect to the record occurrence signals, and providing an operation return signal.

The fetch means comprises noninteractive means and interactive means. The noninteractive means is responsive to a fetch call signal, a noninteractive condition, and the currency signals for retrieving record occurrence signals from the database, for placing the retrieved signals into the first and second buffers, for incrementing the currency signals, and for providing a fetch return signal. The interactive means is responsive to a fetch call signal and an interactive condition signal. The interactive means comprises: means responsive to the status valid signals and to the currency signals for retrieving the record occurrence signals from the database, and for copying the retrieved signals into the first and second buffers, and means responsive to the status invalid signals for copying the record occurrence signals from the first to the second buffer. Further, the interactive means comprises display means responsive to the format signals and to the signals in the second buffer for controlling the display to display a representation of the record occurrence, and is responsive to operator input signals from the input means, for placing an operation selection signal in the operation buffer, and providing a fetch return signal. The display means is further responsive to the status invalid signals and the message signals for displaying representations of an error message.

The calling means is responsive to the operation return signal and to the status invalid signal for providing a fetch means call signal, and is responsive to the fetch return signal for providing an operation call signal.

In a preferred embodiment, the display means is further responsive to operator input signals to modify the signals in the second buffer. Further, the fetch means further comprises condition means responsive to a format identifier signal, to a first value of a condition parameter signal, and to the status invalid signal to provide an interactive condition signal, and is responsive to a format identifier signal, to a first value of a condition parameter signal, and to the status valid signal to provide a noninteractive condition signal.

Other objects, features and advantages will appear from the following description of a preferred embodiment of my invention, together with the drawing, in which:

BRIEF DESCRIPTION OF THE DRAWING

FIGS. 7a and b show a particular screen format employed in my invention, and the same format merged with representations of record occurrences from the database to define a screen image;

FIGS. 12 and 13 show certain screen formats in greater detail;

FIGS. 18, 19, 20 and 21 show in detail certain screen formats;

DETAILED DESCRIPTION OF THE INVENTION

Data processing system generally

Figure 1:
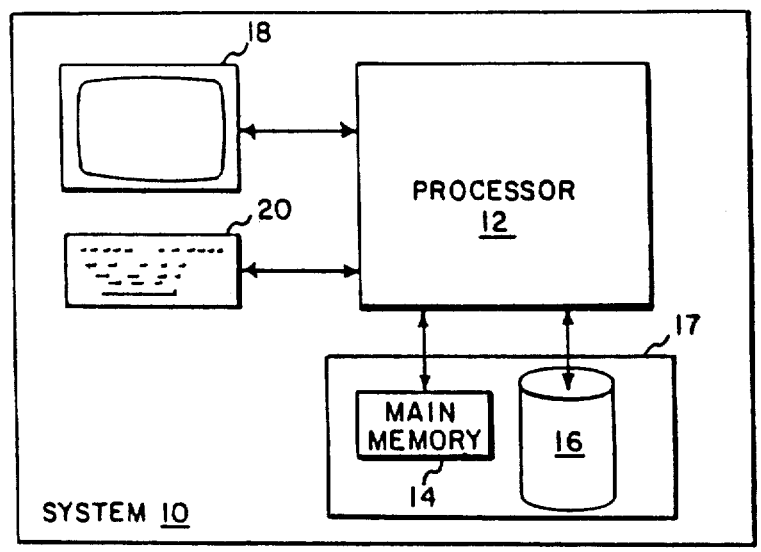
FIG. 1 is a simplified block diagram of a data processing system in which my invention is employed.

Referring now to the drawing, and in particular to FIG. 1, the data processing system 10 has a processor 12, having a main memory 14. Secondary memory 16 is provided in the form of one or more disks. Main memory 14 and secondary memory 16 together comprise storage 17. The description of the present invention does not concern itself with details of moving signals representing portions of programs or data between main memory and secondary memory, as that is well understood in the art of managing data processing systems and the present invention does not pertain to it. It is assumed that signals in all parts of storage 17 are available to processor 12.

One or more terminals or consoles, connected to processor 12, each provides a CRT screen as a display means 18 and a keyboard as signal input means 20. Other signal input means, such as mice, touch screen, voice actuation, and the like, are contemplated by my invention. If my invention is practiced in a large data processing system, there may be additional processors within the system, such as input/output processors, and the operations referred to herein as performed by the "processor" may in fact be divided among such processors. Such details do not affect the scope of the invention.

Keyboard and PF keys

Figure 5:
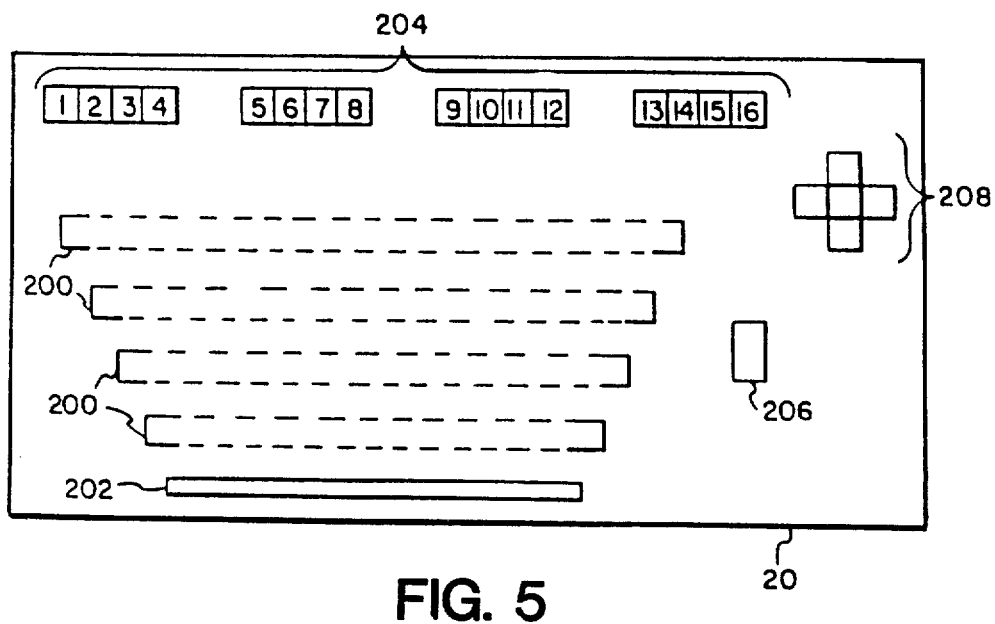
FIG. 5 showns the keyboard of the data processing system of FIG. 1.

Referring now to FIG. 5, keyboard 20 provides the usual keys of a typewriter keyboard, indicated generally at 200, with space bar 202. At the top of keyboard 20 are 16 keys 204, arranged in groups of four; these are called PF (programmed function) keys. Each is assigned a number from one to sixteen, and displays its assigned number. With the use of the shift key, these keys provide thirty-two possible programmed functions. In addition keyboard 20 provides an Enter key 206 and a pad of screen-position-marker control keys 208. (The screen-position-marker is more usually called a "cursor", but that term will not be used for this element in the present description, in order to avoid confusion with the "cursor" used in fetching multiple records from a relational database.)

Storage 17

In the description which follows, the convention is observed that words beginning with "@" are names of pointers to data structures or to elements within storage 17; that words beginning with "$" are names of parameters for particular program elements; and that words ending with "#" are names of indexes to elements within lists or sets in data structures. Elements within a data structure are named by words beginning with the data structure name (or an abbreviation thereof), followed by a period: e.g. "qry.source" is a storage element (or in some cases the signals stored in such storage element) named "source" and located within data structure "QUERY". Words beginning with "DO" are names of modules within the calling program; words beginning with "WZ" are names of external procedures called by the calling program.

Storage 17 of data processing system 10 is regarded conceptually as divided into program storage and data storage. The contents of program storage (shown in FIG. 26) will first be briefly reviewed; the contents of the data storage (shown in FIG. 6) will be described; each module of FIG. 26 will then be described in more detail; and the operation of data processing system 10 with respect to the data structures and according to the modules will then be described.

Program storage

Figure 26:
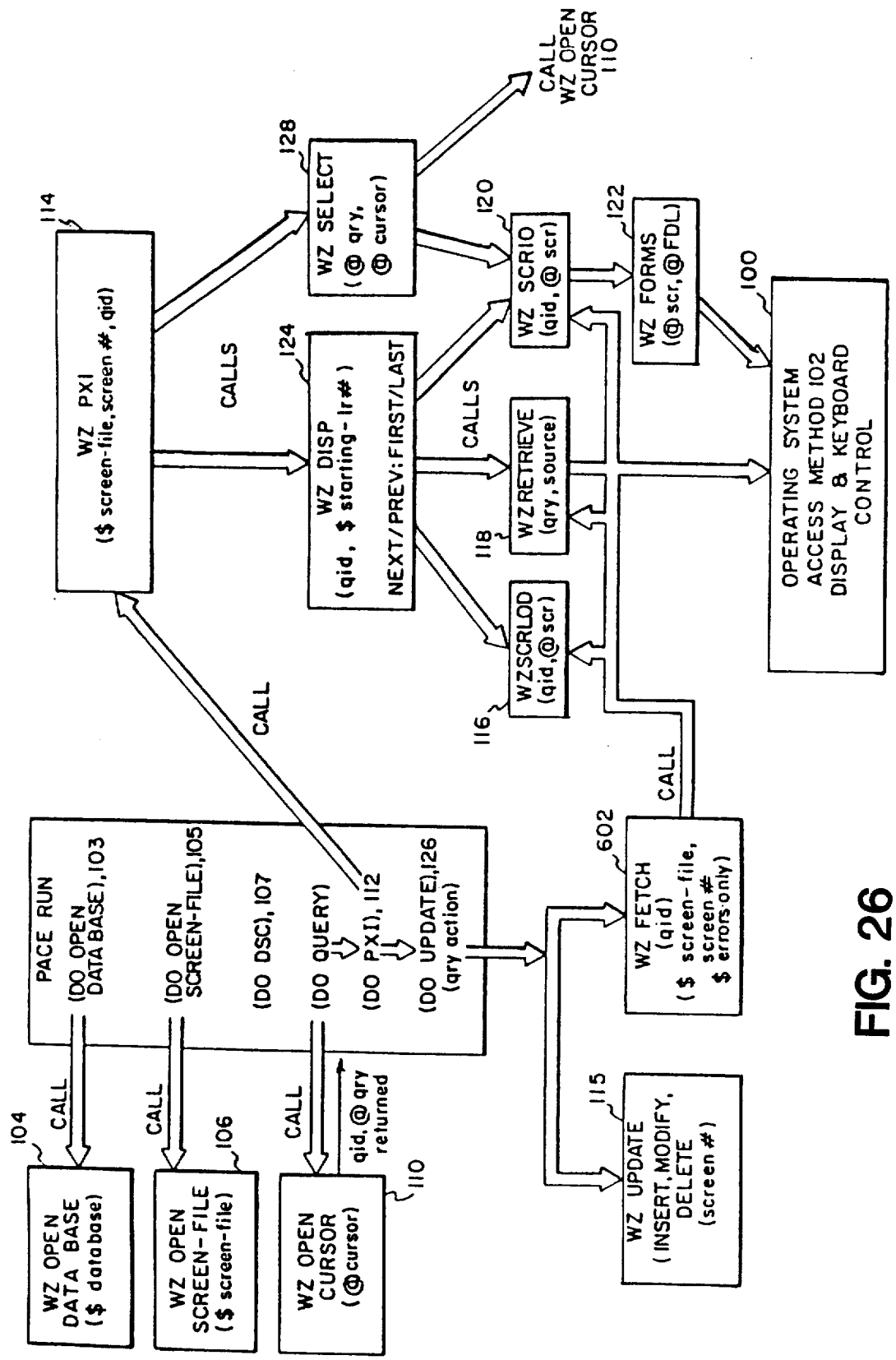
FIG. 26 shows the allocation of program storage, relating to a further aspect of the system.

Referring now to FIG. 26, the program modules provided in program storage are shown conceptually, with an indication of the significant parameters input to each module and an indication of calls from one module to another. In addition, in certain cases parameters returned by the modules are indicated.

It will be readily understoood that such modules and parameters are represented by physical signals, and that during operation, processor 12 copies from program storage signals representing appropriate program elements and uses such signals to control the physical state of hardware elements within system 10 so that the represented operation is physically carried out. It will be likewise understood that when a module is described as "calling" another module, in fact data processing system 10, operating according to the first module, accesses the second module and copies its signals in order to control further operation according to the second module.

Brief description of program storage

Operating system. In the program storage portion of storage 17 there are provided signals representing an operating system program 100, which forms no part of the invention and may be of any desired design, but which must provide an access method 102 suitable for controlling data processing system 10 to retrieve record occurrences from the database in storage 17, to modify or delete record occurrences in the database, and to add new records to the database. In addition, operating system 100 must include program for the control of display 18 and keyboard 20, and specifically, must be able to respond to an appropriate command ("Write/-Read Screen") in a calling program by sending signals representing a stored screen image to display 20, receiving keyboard input signals, modifying the stored screen image in accordance therewith, and in addition storing certain of the keyboard input signals.

Figure 17:
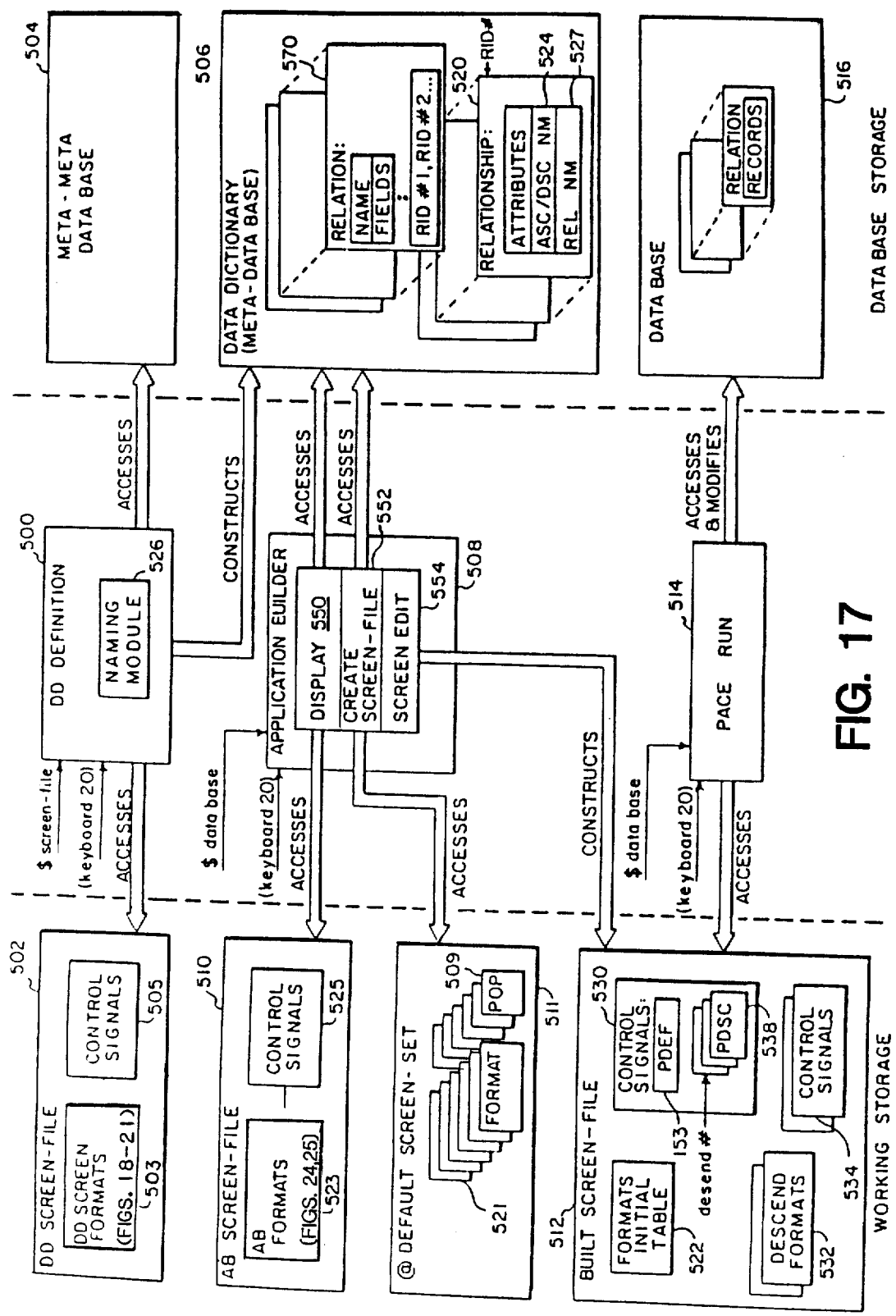
FIG. 17 is a conceptual showing of operations performed by the data processing system of FIG. 1, under the control of particular signals stored in the program storage, with respect to the signals in the data storage of the system.

Calling program. Program storage 17 further provides signals representing a "calling program" which calls programming elements for the operation of the data processing system. In the embodiment described herein, the calling program is titled PACE RUN, but other programs may also be calling programs if they provide means for accomplishing the calling functions generally in the manner described for PACE RUN. In particular, the DD Definition program module 500 and the Application Builder program module 508 of FIG. 17 are also calling programs. The details of such programs are not pertinent to the present invention except as described herein.

The information which must initially be passed from the user of the terminal to the calling program comprises a designation of the database to be accessed, a designation of the screen file to be accessed, and in some cases a cursor. (In other words, a cursor is provided in a manner to be explained). As understood in the art of managing relational databases, a cursor is a statement (or an implementation-dependent data structure derived from such statement) which defines a set of record occurrences to be retrieved from the physical database, and which identifies a position within the set during the process of retrieving the record occurrences.

Within the calling program (PACE RUN) are provided a DO OPEN DATABASE module 103, a DO OPEN SCREEN FILE module 105, a DO DSC module 107, a DO QUERY module 108, a DO PXI module 112, and a DO UPDATE module 126.

A WZOPEN DATABASE module 104 is called by module 103; a WZOPEN SCREEN FILE module 106 is called by module 105; and a WZOPEN CURSOR module 110 is called by DO QUERY module 108. A WZPXI module 114 is called by DOPXI module 112, and the WZDISP module 124 is called by WZPXI module 114. The modules WZRETRIEVE 118 and WZSCRIO 120 are called by WZDISP module 124. WZFORMS 122 is called by WZSCRIO 120. Further, a WZSELECT module 128 is called by module 114, and calls both WZSCRIO module 120 and OPEN CURSOR module 110. A DO UPDATE module 126 is also called by DOPXI, under conditions to be described, and the WZINSERT, WZMODIFY, and WZDELETE modules 115 are called by module 126. Details of the program modules shown in FIG. 26 and of the operation of data processing system 10 under the control of signals representing them will be described in what follows.

Data storage

Figure 6:
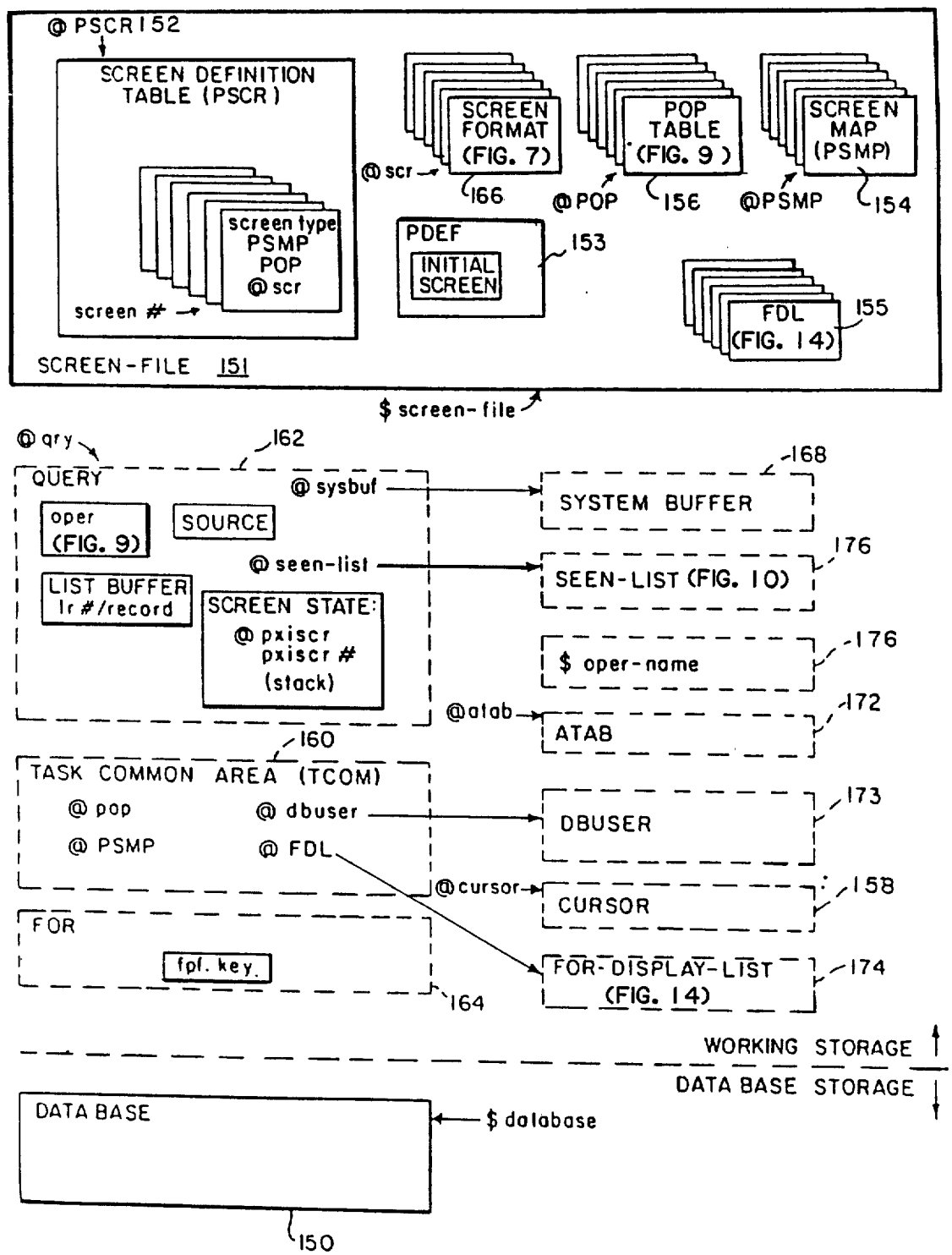
FIG. 6 is a conceptual showing of the allocation of data storage in the data processing system.

Referring now to FIG. 6, the data storage portion of storage 17 is conceptually divided into the database storage means providing signals representing the record occurrences comprising one or more relational databases 150, and working storage. The details of the database storage, as has been explained, are not visible to the user of data processing system 10, and will not be further described.

The working storage is shown as providing signals representing two kinds of data structures: the signals representing those shown in solid lines are provided in storage 17 before operation begins; signals representing the structures shown in dotted lines are placed into storage, or storage space is allocated for them, during the operation of data processing system 10 according to the program elements shown in FIG. 26, as will be described.

Screen-file 151: PSCR, PSMP, POP, and PDEF

Signals representing a screen-file data structure 151 are provided in storage 17, and provide predefined display format signals. Screen-file 151 may be part of the user (calling) program. It may provide display format signals for more than one target relation; for purposes of this description, however, it will be assumed that it is designed for the display of record occurrences from a particular target relation (base table or view) within the named database. More than one screen-file may be provided, if more than one target relation is to be accessed.

Screen file 151 includes PDEF table 153, which provides storage for signals reprsenting the initial screen format to be accessed. Screen file 151 further includes Procedure Screen Definition Table (PSCR) 152; the element @ pscr is a pointer which addresses PSCR 152. PSCR 152 provides stored signals relating to a plurality of screen formats, the signals for each screen being located by the screen index (screen#). For each screen there are provided in PSCR 152 signals representing the screen type (or mode indicator), a pointer @scr which points to a screen format 166 (to be described below in connection with FIGS. 7, 11 and 12), and the names of a Procedure Screen Map (PSMP) and a Procedure Operator Table (POP) associated with the screen.

Screen file 151 further provides, for each screen indexed in PSCR 152, signals representing a screen format 166, a POP table 156, a PSMP 154, and a portion 155 of the For-Display-List.

Figure 9:
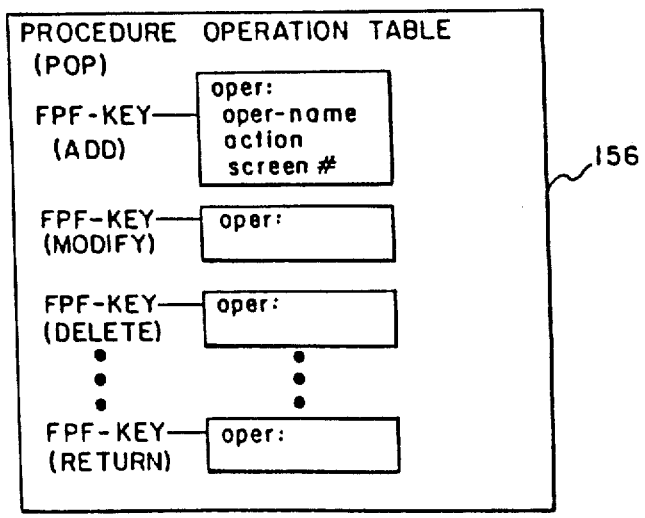

The POP table 156 for a particular screen format 166 is shown in more detail in FIG. 9. POP table 156 provides, for each screen format 166, signals representing information about the operations that may be selected from keyboard 20 while such screen is displayed; these include operations to be performed on the result relation interactively defined during display of that screen format as well as other operations such as scrolling of record occurrence representations and transitions to certain other screen formats. The table is indexed by the value of a storage element called FPFkey, to be described, and for each such value, a data structure called "oper" is provided, giving information regarding the operation which is selectable by means of a PF key on keyboard 20 in a manner to be explained. "Oper" includes the "oper-name" (text to be returned to the calling program), the action (or actions) to be taken, and the screen name of the screen format to be used for the action, when pertinent. In the POP table for the LIST screen, there is an "oper" for each of the operations Add, Modify, Delete, and Return. Other screens may have POP tables containing opers for more or fewer operations. Other operations may also be provided when the POP table is designed.

The Procedure Screen Map (PSMP) 154 for a particular screen format 166 contains signals representing a list of the names of view-fields that are to appear on the display when the screen format is used to display record occurrences from the database. This information is used when filling out the For-Display-List 155/174. Further, PSMP 154 for a particular screen format 166 provides a screen limit signal, defining how many record occurrences can be displayed at one time on such screen.

Screen formats

Figure 11:
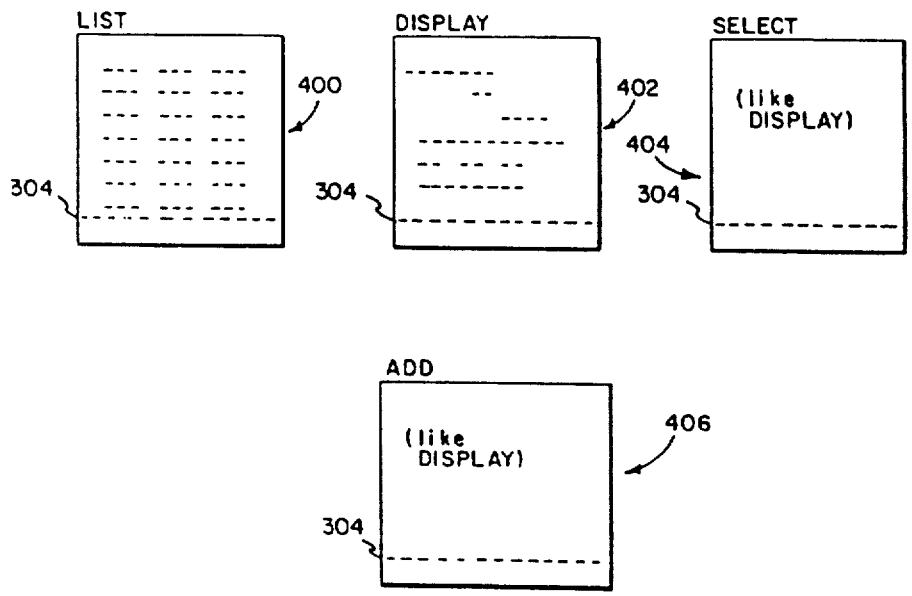
FIG. 11 showns simplified views of the types of screen format employed in my invention.
Figure 4:
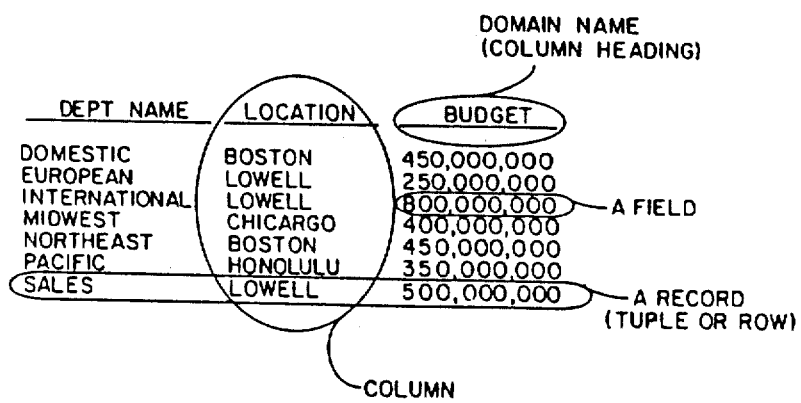
FIG. 4 showns the components of a typical relation of a relational database.

Referring now to FIG. 11, each screen-file may contain signals representing up to six screen formats (shown together as formats 166 in FIG. 6); however, there are only two basic types. The formats are shown schematically in FIG. 11 so that the differences between the two types can be easily seen. The LIST screen format 400 is adapted to show representations of many record occurrences from the database target relation, and therefore provides spaces for the fields of such occurrences, arranged in columns. Fewer than all fields may be shown. The DISPLAY screen format 402 is adapted to show a representation of a single record occurrence from the database target relation, and can show more of the fields of that record occurrence. The formats of the SELECT screen (404) and the ADD, MODIFY, and DELETE screens (406) are basically similar to the formats of the DISPLAY screen, in that representations of the fields of a single record, or of the names of the fields of a single record, are shown, with differences to be described.

LIST screen format

LIST screen format 400 is shown in FIGS. 7a and b in greater detail.

FIG. 7a shows LIST screen format 400 as initially provided in screen-file 151. The title 300 of the screen is provided, with the name of the target relation at 310 and fixed text at 302. Below the fixed text are column headers and empty spaces for the display of record occurrences. A line 304 divides the screen into upper and lower portions 306 and 308. Below line 304, in lower portion 308, are displayed the numbers of particular PF keys among the sixteen keys 204 of keyboard 20 (FIG. 5), together with the name of ENTER key 206 on keyboard 20. Names of selectable operations are represented in association with the key designations.

It will be observed that not all of the sixteen possible PF keys are listed in lower portion 308 of the screen format; this is because only a smaller number of operations are selectable while the LIST screen is displayed. Among those listed is PF key 204-16:Return. Actuation of Key 204-4:Prev causes a previously displayed screen-load of record occurrences in the list to be redisplayed, still using the present format; actuation of key 204-4 with the shift key causes the first screenload of record occurrences in the list to be displayed. Actuation of key 204-5 similarly causes the next screenload to be displayed, and actuation of key 205-5 with the shift key causes the last screenload of occurrences to be displayed. Keys 204-4 and 204-5 thus scroll portion 306. Actuation of key 204-7 causes SELECT screen format (described below) to be displayed. Actuation of keys 204-8 and 204-9 cause one or more of the displayed record occurrences selected by the user by moving the screen-position-marker, to be displayed in the DELETE and MODIFY screen formats, to be described. (If more than one record occurrence has been selected, they will be displayed sequentially on the screen.) Actuation of key 204-6 causes the ADD screen format (described below) to be displayed. Actuation of ENTER key 206 (on keyboard 20, FIG. 5) causes a transition to the DISPLAY screen format, in which an enumerated record occurrence is represented.

The displayed key indentifiers including PF key numbers and key names, with corresponding operation names, provide representations of a plurality of selectable operations, including operations executable with respect to the members of the result relation to be provided by the relational operator means, as will be described.

In FIG. 7b, the retrieved record occurrences are represented below the column headers.

Other formats

Referring now to FIGS. 12 and 13, the remaining screen formats are shown in more detail than in FIG. 11.

FIG. 12 shows DISPLAY screen format 402, with representations of the fields of a single record occurrence. This screen format is shown in response to actuation of ENTER key 206 (on keyboard 20, FIG. 5) while the LIST format is displayed. The names of the fields in the record are given to the left of the values of the fields. Selectable operations are displayed in lower portion 308 of the format. Actuation of PF key 204-16 (Return) causes a return to a view of the LIST screen format. Actuation of PF keys 204-6 (Add), 204-8 (Delete), and 204-9 (Modify) permits the user to view the same record occurrence that is displayed in the DISPLAY screen format, but displayed in one of formats 406, so that the indicated operation can be performed.

SELECT screen format 404, which is shown in response to actuation of PF key 204-7 while the LIST format is displayed, is similar in arrangement to format 402, but the values of some or all of the fields are represented by question marks and blanks. This screen permits the user to position the screen-position-marker at a particular field (open element) and to enter a characterizing value into the field, for the purpose of selecting from the target relation (named at 310) in the database, record occurrences which have that value in the selected field. More than one field may be so characterized.

Referring now to FIG. 13, the Update screen formats 406 are shown. ADD screen format 406-1 is similar to the SELECT screen format, but in this case, the user must fill in all the fields necessary to constitute a new record occurrence to be added to the target relation (named at 310) of the database. MODIFY screen format 406-1 is similar to DISPLAY format 402, but the representations of the values of the fields are shown highlighted (or otherwise distinguished from the attribute names), to indicate that the user can modify these values, for the purpose of modifying in the database the record occurrence represented on the screen. DELETE screen format 406-3 is again similar to DISPLAY format 402, but the selectable operations include "Delete" or "Skip record".

Cursor 158

Referring again to FIG. 6, signals representing a cursor are provided in storage at 158, with a pointer @cursor. The particular cursor represented in storage element 158 may be either provided by the calling program or derived from an initial cursor in a manner to be described, or otherwise defined. As previously stated, a cursor is a statement (or an implementation-dependent data structure derived from such statement) which defines a set of records to be retrieved from a target relation in the database, and which identifies a position within the set during the process of retrieving the records.

Other data structures

Still referring to FIG. 6, storage for the data structures Task Common Area (TCOM) 160, QUERY 162, Seen-List 176, ATAB 172, For-Display-List (part two) 174, DBUSER 173, and FOR 164 is allocated during operation of data processing system 10, as will be described. In addition, storage for a System Buffer 168 is allocated during operation, as will be described.

Description of program modules and interaction with storage

Figure 2:
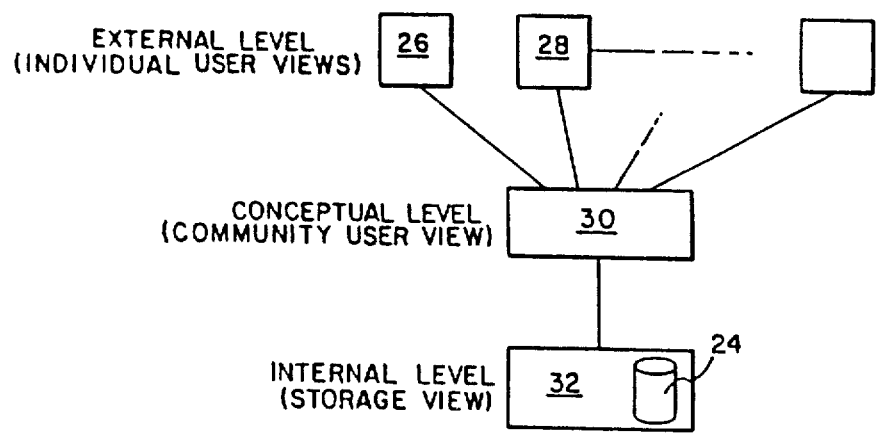
FIGS. 2 and 3 are conceptual diagrams showing the relationship between the physical records comprising the database, and the user of the data processing system.
Figure 3:
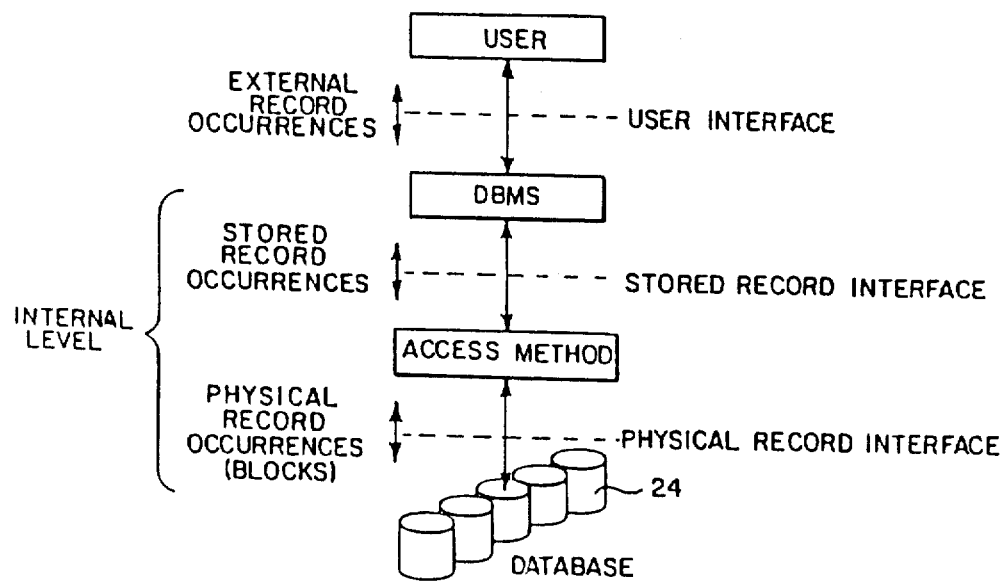

WZOPEN DATABASE 104. Data processing system 10 operates under control of signals representing program element WZOPEN DATABASE 104, called the calling program, with respect to a particular database (named by the parameter $database). The information as to which database is to be accessed ultimately comes from the user of the data processing system terminal. Operating according to module 104, data processing system 10 allocates space in storage 17 for the data structure DBUSER 173, which provides signals representing pointers to lists of descriptors of database records, files, relationships, and views, and other data pertinent to the opened database. Such descriptors provide signals for defining the conceptual records of level 30 (FIG. 2) in terms of the stored or internal record occurrences of level 32. Data processing system 10 then allocates in storage 17 space for signals representing the structure Task Common Area (TCOM) 160, which contains storage for various pointers to be used in subsequent operation, and in particular, contains storage for the pointer @for-display-list, which points to For-Display-List (part two) 174, and the pointer @dbuser, which points to DBUSER data structure 173.

Apart from the above, the procedure of opening a database so that record occurrences may be retrieved from it is well understood in the database management art and will not be particularly described herein.

WZOPEN SCREEN FILE 106. Data processing system 10 operates according to signals representing program element WZOPEN SCREEN FILE 106, called from the calling program, with respect to the parameter $screen-file (supplied ultimately by the user). The parameter $screen-file names the particular screen-file 151 to be accessed. If signals representing the particular screen-file referred to are not present in main memory 14, data processing system 10 loads signals representing PSCR 152 from secondary memory 16 at this time under the control of WZOPEN SCREEN FILE module 106; this operation forms no part of the invention.

DO DSC 107. Operating according to signals representing the DO DSC module 107 within the calling program, data processing system 10 defines an initial cursor, and places signals representing it in the data structure CURSOR 158 within storage 17. The cursor is defined against a target comprising at least one of the relations within the named database. The target may be either a base table (represented in storage by a distinct stored file) or a view (a view is a table relation that does not have any existence in its own right but is instead derived from one or more base tables.)

DO QUERY 108. The module DO QUERY 108 within the calling program for purposes of the present description serves only to control data processing system 10 to call WXOPEN CURSOR module 110 and DOPXI module 112.

OPEN CURSOR. The module WZOPEN CURSOR(@cursor, $qid) 110 is employed to control data processing system 10 to open the cursor defined by signals in data structure 158. The procedure of opening a cursor for the purpose of fetching multiple record occurrences defined by the cursor is in general well understood in the art of database management, and will not be described in detail herein In the particular embodiment described herein, data processing system 10 operating under the control of signals representing WZOPEN CURSOR module 110 allocates space within 17 for the QUERY data structure 162, corresponding to the cursor pointed to by @cursor. A single QUERY data structure corresponds to a single cursor. QUERY data structure 162 is pointed to by @qry, and contains signals representing the pointer @sysbuf, which points to System Buffer 168, pointer @pxiscr, which points to the screen format to be used during operation according to my relational operator or to the screen most recently used (to permit returns), pointer @seen-list, which points to Seen-List 176 (to be described), and others. Further, QUERY data structure 162 provides storage for a data element called "oper", a buffer called List-Buffer, and the data element "source", all of which will be described in what follows.

Data processing system 10 under control of WZO-PEN CURSOR module 110 returns the identifier "qid" for the QUERY. Further operating under control of WZOPEN CURSOR module 110, data processing system 10 selects an access strategy to be used in retrieving physical record occurences from database 150, as defined by the cursor; the process of selecting an access strategy is well understood in the database management art and will not be described herein.

DO PXI 112. Operating under the control of signals representing the module DO QUERY 108, data processing system 10 calls DOPXI(screen#) module 112, and after performing certain operations not pertinent herein, calls WXPXI($screen-file, screen#, $qid) module 114. "$screen-file" is a parameter which names the screen-file to be referred to; "screen#" is an index to the particular screen format within the screen-file. As stated in connection with Screen-File 151, the name of the initial screen to be accessed is provided by the calling program, and signals representing the name are stored in "initial-screen" within PDEF 153 in Screen-File 151. Names of screens accessed in subsequent operations are provided in a way to be described in what follows. As noted above, "qid" is the identifier for the QUERY. Operation according to WXPXI will be described below; it returns a value by placing signals representing such value within data structure ATAB 172 (FIG. 6). This value represents one of the operations Add, Modify, Delete, or Return; other operations may also be provided. In addition, WZPXI may return signals representing the characters of "oper-name" within the storage element 170 pointed to by $oper-name; this pointer is supplied by the calling program if desired. Either or both of the values in ATAB 172 and the characters comprising "oper-name" are available to the calling program for further testing; they may be used in different circumstances, not pertinent herein.

Upon return from WZPXI, data processing system 10 under the control of DOPXI tests the signals representing the value returned from WZPXI within data structure ATAB 172. For the actions Add, Modify, or Delete, data processing system 10 under control of DOPXI calls appropriate program modules (shown as DO UPDATE module 126 and WZINSERT, DELETE, MODIFY module 115 called by module 126) in order to carry out the indicated operation.

WZPXI 114. Under the control of module WZPXI($screen-file, screen#, $qid) (114) data processing system 10 tests the signals representing the screen type (mode indicator) of the screen pointed to by "initial screen" in PDEF 153 (for the first iteration of WZPXI) or the screen type of the screen pointed to by qry.@pxiscr (for subsequent iterations).

Ignoring for the moment the possibility that the screen type is SELECT (which will be discussed below), if the screen type is either LIST or DISPLAY, module WZDISP 124 is called. Operation according to WZDISP module 124 will be described below; during such operation, representations of one or more record occurrences defined by the cursor are displayed in either the DISPLAY (one occurrence) or the LIST (multiple occurrences) screen formats. When such operation is completed, signals have been placed in qry.oper representing an operation selected by actuation of a PF key by the terminal user.

When data. processing system 10 returns from WZDISP module 124, operating further according to WZPXI module 14, it tests the signals stored in the storage element qry.action (within qry.oper). Certain actions (including a transition to a SELECT screen, discussed below) may be executed by data processing system 10 operating further according to WZPXI module 114; such operation includes resetting qry.@pxiscr and qry.pxiscr# to keep track of the transition. Otherwise, data processing system 10 operating further according to WZPXI module 114 copies signals representing qry.oper-name (within qry.oper) from QUERY data structure 162 to the location 170 pointed to by $oper-name, places signals representing the action into ATAB 172, sets qry.source to indicate either selection through the DISPLAY screen, selection through the LIST screen from the cursor, selection through the LIST screen by the marked screen list, or selection through the SELECT screen. The operation represented by signals in $oper-name and ATAB 172 may be Add, Modify, Delete, or Return. (The possibility that the operation is Select will be discussed below.)

WZDISP 124. Operating according to WZDISP module 124 with respect to the parameters $qid and $starting-lr# (lrf# = list record number, stored in qry.List-Buffer; the starting-lrf# is provided by WZPXI based on the screen state), data processing system 10 calls WZSCRLOD($qid, Escr) module 116 to complete the For-Display-List, as will be described, and then calls WZRETRIEVE(qry.source) module 118 to obtain a record occurrence to be displayed. Operation according to WZRETRIEVE will be described below. For the LIST screen, WZRETRIEVE is called repeatedly; record occurrences are retrieved one at a time until either a full screenload has been retrieved (as defined by the screen limit signal in the PSMP 154 for the screen), or there are no more record occurrences to be retrieved, that is, all those defined by the cursor have been retrieved. As each record occurrence is retrieved, signals representing its key are placed in Seen-List 176.

Upon return from WZRETRIEVE module 118, further operating according to WZDISP module 124, data processing system 10 calls WZSCRIO module 120 to cause representations of the retrieved record occurrences to be displayed. Operation according to WZSCRIO will be described below. Upon return from WZSCRIO module 120, data processing system 10 operating further according to WZDISP module 124 tests the signals stored in qry.action (within qry.oper).

If the action is a transition from DISPLAY to LIST format (selected by actuation of PF key 204-16:Return on DISPLAY format 402, FIG. 12) or from LIST to DISPLAY format (selected by actuation of ENTER key 206 on keyboard 20, LIST format, FIG.7), data processing system 10 resets qry.@pxiscr and @scr to point to the new screen; the index qry.pxiscrf# is used to keep track of transitions between screen formats. For such a transition operation, operating then further according to WZDISP and modules called therefrom, responsive to the screen-type of the screen format indicated by the reset pointers, data processing system 10 displays representations of the retrieved record occurrence or occurrences in the appropriate screen format.

If the action in qry.action is Next, Previous, First, or Last, the indicated scrolling operation is carred out by data processing system 10 while operating according to WZDISP module 124. Next or Previous causes the next or previous screenload of representations of record occurrences to be displayed; First or Last causes the first or last screenload to be displayed. If a previous screenload is to be dislayed, the record occurrences are found using the keys stored in Seen-List 176; otherwise record occurrences must be retrieved using the QUERY data structure 162. These operations result in scrolling the displayed list of record occurrences.

It will be evident that the user can select unlimited successive operations of scrolling or transition between LIST and DISPLAY screen formates without causing data processing system 10 to return from WZDISP module 124. The PF key Return causes a return to the previously displayed screen format, if any (as indicated by qry.pxiscr#), or else a return to the calling program.

Figures 8, 14:
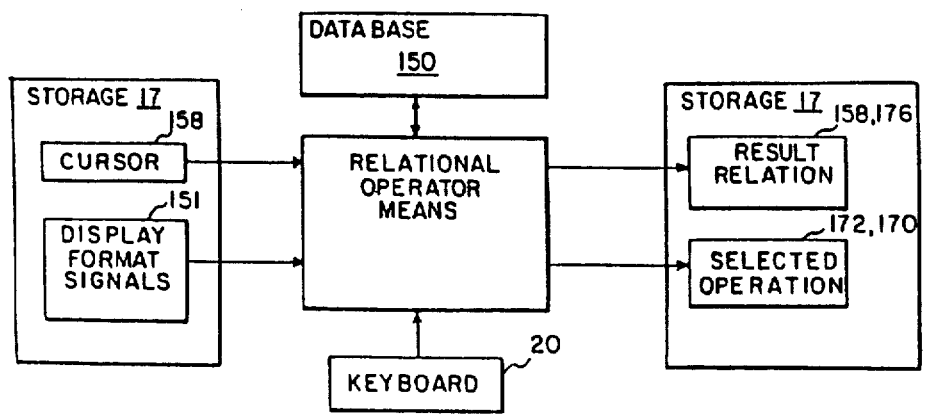
FIG. 8 is a conceptual (black box) showing of the relational operator means of my invention.
FIG. 14 showns a portion of FIG. 6 in more detail.

WZSCRLOD 116. Operating according to WZSCRLOD($qid, @scr) module 116, data processing system 10 accesses the appropriate POP table 156 and PSMP 154 for the particular screen format 166 pointed to by @scr, and fills out the right hand portion of the For-Display-List. Referring now to FIG. 14, the left hand portion of the For-Display-List is provided by data structure 155 within Screen-File 151; for each view field to be displayed on the screen, the location (row and column on screen), the length, and other appropriate information is provided. The right hand portion is provided by data structure 174; for each view field, the memory location, length, type, and other appropriate information about the record occurrence is provided. Portion 174 thus provides the addresses of record occurrences to be displayed; for a LIST screen format, these addresses are to the qry.List-Buffer, while for a DISPLAY screen format the addresses are to System Buffer 168. Display of representations of attribute names as headers 303, view name as view title 310, the appropriate PF keys 204 for the operations selectable during display of the particular screen format 166, and other information is provided for by screen format 166.

WZRETRIEVE 118. Operating according to WZRETRIEVE(qry.source) module 118, data processing system 10, taking into account the signals in qry.source, calls access method 102 of operating system 100. Access method 102 is responsive to signals provided by data processing system 10 operating according to WZRETRIEVE module 118 to cause data processing system 10 to retrieve from the target within the named database 150 one record occurrence specified by the cursor and to store signals representing the retrieved record occurrence in System Buffer 168.

For the LIST screen (which displays a plurality of record occurrences), since System Buffer 168 holds only one record occurrence, signals representing the retrieved occurrences are copied to qry.List-Buffer by data processing system 10 operating according to WZDISP module 124. WZRETRIEVE is repeatedly executed until there are no more record occurrences defined by the cursor, or until enough record occurrences have been retrieved to fill the screen, as defined by the screen limit indicator in PSMP 154.

WZSCRIO. Operating according to WZSCRIO(@qry=$qid, @scr) module 120, data processing system 10 calls WZFORMS(@for-display-list) module 122 to merge the record occurrences pointed to by the For-Display-List (FIG. 14) with the screen format pointed to by @scr, for display to the user. The operation of data processing system 10 according to WZFORMS will be described below; when such operation is complete, signals have been placed in for.fpf-key, and the stored screen image may have been modified corresponding to user input signals. Upon return from WZFORMS, operating further according to WZSCRIO, data processing system 10 uses the signals stored in for.fpf-key (as will be described) as an index to the signals within the POP table data structure 156 for the screen that has been displayed, and copies therefrom signals representing the element "oper", containing "oper-name" and "action", corresponding to the PFkey number, into the storage element qry.oper within QUERY data structure 162.

The signals stored in qry.oper are output signals of the relational operator means, representative of the operation selected by the user.

Figure 10:
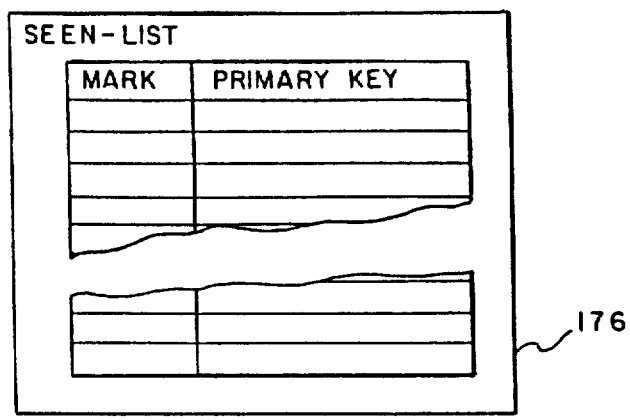
FIGS. 9 and 10 are conceptual showings of portions of FIG. 6 in more detail.

Further operating according to WZSCRIO module 120, data processing system 10 modifies Seen-List 176 by marking records (by setting a flag in the "Mark" column of the list, as seen in FIG. 10) that have been enumerated by the terminal user, as will be described. Processing system 10 returns from WZSCRIO module 120 to WZDISP module 124.

WZFORMS 122. Under control of WZFORMS(@for-display-list, @scr) module 122, data processing system 10 uses the signals representing the addresses in For-Display-List 155/174 to obtain the record occurrence signals from the addressed buffer, and to merge them with the predefined display format signals of Screen-File 151 in order to modify screen format 166 and thereby to define a resultant stored screen image. For the LIST screen, the record occurrence signals are taken from qry.List-Buffer; for the DISPLAY screen a single record occurrence is taken from System Buffer 168.

Further under control of WZFORMS 122, the data processing system calls Operating System program 100, and operates according to the display control signals therein to control display 18 to display a representation of the resultant screen image stored at 166. Further, during this display, the data processing system enables keyboard 20. The user of the console or terminal may use keyboard 20 to provide input signals.

If on the LIST screen the screen-position-marker is positioned by the user next to the representation of a particular record occurrence, and a PF key 204 is actuated, by default that record occurrence is taken to be enumerated. Alternatively, the user may enter an "X" or other character next to one or more record occurrences to enumerate them.

The keyboard signals provided by the user are interpreted by the data processing system, operating according to operating system 100, to modify the stored screen image. A signal corresponding to the actuated PF key is also stored. After return from WZFORMS, data processing system 10, under the control of QZSCRIO and WZDISP, interprets the user's input keyboard signals as enumerating signals, effecting enumeration of certain of the retrieved record occurrences whose representations are displayed, and operation selection signals, effecting selection of one of the plurality of selectable operations. Selectable operations are defined for each screen format, but always include Return.

Further operating according to WZFORMS module 122, the data processing system copies the stored signals representing the PF key number to the data storage element for.fpf-key within FOR data structure 164.

When the PF key signals have been copied to for.fpf-key, the data processing system returns from the module WZFORMS 122 to the module WZSCRIO 120.

Operation

In operation according to the signals representing the modules and data structures that have been described, the user of the data processing system terminal selects a database to be accessed and a screen file to be used for the purpose (defined for a particular base table or view). This may be done interactively through the keyboard, or by a calling program. The database 150 and screen file 151 are opened by data processing system 10, which allocates storage space for the DBUSER data structure 173 and TCOM data structure 160. The user formulates a query to the database, represented by a cursor. Data processing system 10 opens the cursor and allocates storage for QUERY data structure 162, determines the strategy for obtaining record occurrences from database 150, and defines qid.

Operating according to WZPXI with a LIST screen format indexed by screen#, data processing system 10 calls WZDISP(qid) module 124. Operating according to WZDISP, data processing system 10 calls WZRETRIEVE(qry.source) which then calls access method 102 within operating system 100, to retrieve from the target signals representing a record occurrence defined by the cursor, and to store them in System Buffer 168. For LIST screen, multiple record occurrences are retrieved and their signals are stored in qry.List-Buffer.

Upon return from WZRETRIEVE, data processing system 10 calls WZSCRLOD module 116 to complete For-Display-List 155/174, and then calls WZSCRIO module 120; operating according to this module data processing system 10 calls WZFORMS module 122. Operating according to WZFORMS, data processing system 10 uses the address signals in For-Display-List 155/174 to merge the predefined display format signals from LIST screen format 400 stored at 166 within screen-file 151 with the retrieved record occurrence signals stored in qry.List-Buffer, in order to modify the LIST screen format and thereby to define a resultant stored screen image.

Operating according to operating system 100, data processing system 10 then controls display 18 to display a representation of the defined resultant screen image. During this display, system 10 enables keyboard 20. The user may use keyboard 20 to provide enumerating signals, effecting enumeration of certain of the retrieved record occurrences whose representations are displayed; further, by actuating a PF key, the user provides operation selection signals, effecting selection of one of the plurality of selectable operations displayed on the LIST screen.

When a PF key has been actuated, assuming that some records have been enumerated, the data processing system 10 operates according to operating system 100 to modify the defined screen image to correspond with the user's input signals. Further, data processing system 10 causes signals representing the number of the actuated PF key to be stored.

Further operating according to WZFORMS module 122, data processing system 10 copies the PF key signals to the data storage element for.fpf-key within FOR data structure 164. Upon return from WZFORMS, operating further according to WZSCRIO module 120, data processing system 10 uses the signals stored in for.fpf-key as an index to the POP table data structure 156 corresponding to the LIST screen, and copies therefrom the signals of the "oper" corresponding to the actuated PF key into the storage element qry.oper within QUERY data structure 162. The signals in qry.oper-action are output signals of the relational operator means, representative of the operation selected by the user. Further operating according to WZSCRIO module 120, data processing system 10 sets mark flags within Seen-list 176 to mark enumerated records as indicated in the modified screen image.

Upon return from WZSCRIO, further operating according to WZDISP module 124, data processing system 10 tests the signals stored within qry.oper-action. If the action is Next, Prev, First, Last, Return (from Display to List) or Display, system 10 can execute the selected operation while operating according to WZDISP module 124. These actions can be selected as frequently as the user desires, and in any sequence, in order to allow the user to obtain a display of desired record occurrences before enumerating a set and performing operations such as Modify and Delete on the selected occurrences.

If the action is not one of Next, Previous, First, Last, Return to LIST from DISPLAY, or DISPLAY from LIST, data processing system 10 returns to WZPXI module 114. If the action is Modify, Delete or Add, (or other action defined in the POP table but not described herein), WZPXI module 114 returns to the calling program to interpret the action. The specific calling program shown in the present embodiment calls modules 126 and 115 in order to execute the Modify, Delete and Add operations, with the appropriate screen formats from screen-file 151.

If the user enumerates more than one record occurrence on a LIST screen, and then actuates a PF key selecting Delete or Modify, a representation of each enumerated record in turn will be displayed on the indicated screen until all have been displayed.

As a result of the operation that has been described, there is provided an enumerated relation, derived interactively from the initial cursor provided by the calling program in accordance with the user's enumerating signals input through keyboard 20. The enumerated relation (of one member) can be defined by the user through the LIST screen, as has been described, by positioning the screen-position-marker next to the representation of a record occurrence and actuating a PF key; alternatively, the enumerated relation (of one or more members) can be defined by entering a character next to one or more record occurrence representation and actuating a PF key. Finally, the actuation of a PF key by the user while the DISPLAY screen is displayed results in defining an enumerated relation comprising the single record occurrence that is displayed. Further, there is provided an output signal representative of an operation selected by the user from the displayed selectable operations. In all these cases, the enumerated relation is specified by signals representing a "modified cursor" comprising the enumerating marks in the Seen-List. Further operation according to the calling program, which receives signals representing the "modified cursor" and the selected operation, is thus independent of the manner in which the enumeration was accomplished.

SELECT screen

In addition to the means for defining an enumerated result relation, there is provided means for interactively defining a characteristically defined result relation, that is, a relation, membership in which is defined in terms of record occurrence attributes that are explicitly defined and present in the database target. This is accomplished by means of SELECT screen format 404 and WZSELECT module 128, together with elements already described.

Referring now again to FIG. 26, signals representing a further program module, WZSELECT 128, are provided in the program portion of storage 17 within data processing system 10. When data processing system 10 operates according to WZPXI module 114, as has been described, it tests the signals representing the screen-type (mode indicator) of the screen indexed by screen# within Screen-File 151 (indicated by qry.@pxiscr). If the screen is a SELECT screen, WZPXI calls WZSELECT module 128. Qry.@pxiscr is set to indicate a SELECT screen during operation according to WZDISP module 124, if the user actuates PF key 204-7 while the LIST screen is displayed. WZPXI uses the value of qry.pxiscr# to keep track of transitions between the SELECT screen and the LIST/DISPLAY screens.

Data processing system 10 operates according to WZSELECT module 128 with respect to the signals representing input parameters @qry and @cursor, and calls WZSCRIO module 120 to display SELECT screen format 404 (FIG. 12). The format includes the names of the target relation and view-fields for the target relation.

Operating according to WZSCRIO module 120, data processing system 10 calls WZFORMS module 122, and operates in accordance therewith in the manner that has been described, to display a representation of the SELECT screen format 404, including the target view name at 310 and the view-field names in portion 306. The view name and view-field names are generic elements. Any value of an attribute (field) that was previously made part of the cursor, as a search criterion, is represented on the select screen next to the field names; the remaining fields are shown blank.

The fields, whether blank or displaying previously entered search criteria, are open elements, that is, the user can enter characterizing elements into the open elements. The user can position the screen-position-marker to a desired field, and can enter a value into that field using the typewriter keys 200 of keyboard 20 (FIG. 5) to provide characterizing signals. The display will be altered accordingly. This can be done to more than one of the displayed fields, if desired. The characterizing values entered by the user into the open elements provide new search criteria, further refining or characterizing the cursor with respect ot the attributes of the record occurrences in the target relation of the named database.

Finally the user actuates one of the PF keys corrresponding to the displayed selectable operations. Selectable operations on the SELECT screen include List, Delete and Modify. Signals representing the actuated PF key are stored in for.fpf-key in the manner previously described, and data processing system 10, operating according to WZSCRIO module 120 in the manner previously described, copies the POP.oper signals for the actuated key to qry.oper.

However, operating further according to WZSELECT module 128, data processing system 10 derives a new cursor by modifying the signals of the CURSOR data structure 158 to reflect the characterizing values entered by the user into the displayed view fields. Data processing system 10 then closes the original cursor (by calling and operating according to an appropriate module, not shown, but conventional in design) and then calls WZOPEN CURSOR module 110. Operating according to the signals of module 110, data processing system 10 allocates storage for a new QUERY data structure 162, corresponding to the new (modified old) cursor. Data processing system 10 then returns from WZSELECT module 128 to WZPXI module 114. Data processing system 10 sets qry.source to reflect the screen type pointed to by qry.@pxiscr.

The result of the operation according to the WZSELECT module is that there is interactively provided a result relation, defined characteristically, that is, in terms of attributes represented explicitly in the record occurrences within the target relation of the database. Further, there are provided output signals representative of an operation selected by the user from the displayed selectable operations, including operations performable by data processing system 10 on the result relation.

If the actuated PF key selected the LIST operation, WZPXI, responsive to the screen-type of the LIST screen, will call WZDISP module 124 in the manner previously described, for the display on the LIST screen of the record occurrences defined by the redefined cursor. The user can now enumeratively define a relation, derived from the redefined cursor. If the actuated PF key selected either Delete or Modify, representations of the record occurrences specified by the redefined cursor will be displayed sequentially on the appropriate screen, permitting such action to be taken by the user with respect to each record occurrence in the database.

In preferred embodiments, the relational operator means comprises means for providing an output signal representative of an operation selected from a plurality of selectable operations displayed to the user, together both with means for providing a result relation, membership in which is defined enumeratively and interactively through the keyboard, and with means for providing a result relation, membership in which is defined characteristically and interactively through the keyboard. However, either means for providing a result relation may be provided without the other, and considerable advantages in the interactive maintenance of relational databases may be realized thereby.

If means to define both enumeratively and characteristically defined result relations are to be provided, then the WZPXI module 114 must provide signals representing instructions of the following general form (the terminology is not that of any standard programming language):

set pxi-handled-action = yes
loop while pxi-handled-action = yes:
    test screen type of screen pointed to by qry.@pxiscr
    if type is SELECT, call WZSELECT (that will set qry.action)
    if type is DISPLAY or LIST, call WZDISP (that will set qry.action)
    test qry.action
    if action is Select, List or Display, get the appropriate screen (and loop)
    else if action is other, set pxi-handled-action = no, (exit loop) return to DOQUERY Operating according to the calling program which has called the modules described herein for the operation of my relational operator means, data processing system 10 can obtain signals representing the selected PF key operation from $oper-name. Such signals are also provided in ATAB data structure 172. (The signals are provided in two forms for reasons not pertinent to the present description.) Data processing system 10 can then proceed with further operation as controlled by the calling program.

The relational operator means has provided a result relation, derived interactively from the initial cursor provided by the calling program in accordance with the user's signals input through keyboard 20. The result relation may be either an enumeratively defined relation, specified by a "modified cursor" comprising the enumerating signals (represented as the marks in Seen-List 176, FIG. 10) or a characteristically defined relation, defined by the modified cursor signals in CURSOR data structure 158.

In either case, the interactively defined result relation has the characteristics of a relation as defined in the context of relational databases, that is, further operations, designed and built for use on relations, can be carried out on the result relation. In particular, the records of the result relation can be retrieved under the control of modules designed for the retrieval of records in a relation. Moreover, the result relation can be operated on by the calling program in any desired manner without regard to the specific way in which it was defined, making the calling program independent of the physical structure that was used (keyboard, touch screen, or the like), as well as independent of whether the result relation was enumeratively or characteristically defined. This provides great flexibility in the use of such result relations.

Referring now to FIG. 8, my relational operator means is shown conceptually as a "black box". The inputs to the back box are the cursor signals, provided, as has been described, by the calling program (or defined by WZSELECT module 128 in the particular case when the initial screen is a SELECT screen, as has been described), and display format signals, which have been predefined and stored in Screen-File 151. The signals from keyboard 20 are further input to the black box, which produces output signals representing a result relation, together with a selected operation (selected from among those presented to the user for selection by PF key actuation). The signals representing the result relation are stored in CURSOR data structure 158, and also in Seen-List 176 (for the enumeratively defined result relation); the signals representing the selected operation are stored in data structures ATAB 172 and $oper-name 170.

Since the described relational operator means in effect operates to transform an input relation (defined by the cursor) into a result relation, this operator means is closely analogous to the well known relational operators, defined for operation on the tables of relational databases, namely PROJECT, SELECT and JOIN. (Other relational operators have also been defined by various writers.) A necessary characteristic of a relational operator is that it operate on a relation to produce another relation, which can itself be operated on by a relational operator. This characteristic is otherwise expressed (in mathematical terms) as the statement that the set of possible relations is closed under the operation of a relational operator. Note that the result relation need not be a physical or base table within the database, but it must conform with the definition of a relation.

The described operator means complies with this requirement, and thus can be regarded as a relational operator. This feature of the operator means makes it possible to employ this means as part of a sequence of relational operators. Further, it makes it possible to fetch from the database the records of the result relation, using the same operation that is used to fetch records of any relation defined in the usual way by a cursor. This provides economy of programming and simplicity of operation.

However, each standard operator, when applied to a relation, implicitly defines a result or product relation, membership in which is determined by the value of one of the attributes of the records within the initial relation defined by the cursor. That is, membership in the result relation is defined "characteristically", by means of a characteristic or attribute of the records that is explicitly present in the database. For example, it is possible to SELECT from a table of customers those customers having green hair, only if hair color has been defined as an attribute for that relation.

In contrast, my relational operator means provides for the definition of a result relation, membership in which is defined "enumeratively", that is, by means of enumeration by the user through the keyboard, and such membership may therefore be independent of the record occurrence attributes explicitly defined and present in the stored database, but may depend on some aspect of the entity underlying the record, perhaps known only to the user.

Therefore, my novel operator means makes it possible to construct interactively an arbitrary set, enumerated by the user, and thereafter to treat the set as a member of the class of relations, with all the advantages of data manipulation which result from this. In prior art data management systems, a table of enumerated members could be built, but only by explicit programming (in the applications program) designed for such purpose, and the constructed table could not then be treated as a member of the set of relations. Consequently, for example, the records could not be fetched using the same operation that is used to fetch records in the relations; rather, an additional program module had to be provided for this purpose.

My operator means further provides for the interactive definition of a result relation, membership in which is defined characteristically in terms of a record occurrence attribute explicitly defined and present in the database; such interactive definition is thereby made much simpler than has been possible using prior art means.

The relational operator means described above is employed sequentially with respect to more than one screen-file and more than one database, to effect the interactive construction and execution of a database maintenance application program.

Reference is made to FIG. 17. In this conceptual showing are represented the operations of data processing system 10, with respect to the working storage and database storage portions of storage 17, under the successive control of certain program modules. It will be understood that during such operation, the signals representing each program module are copied from program storage and are used to control the physical state of various hardware elements of system 10 in order to effect the desired physical operations. In this figure, for simplicity, the data processing system is not itself explicitly represented. However, the lines labeled "accesses" represent operation by processor 12 to read (obtain signals from) the represented storage structures in storage 17; the lines labeled "constructs" represent operation by processor 12 to allocate storage for write (place signals into) the represented storage structures in storage 17. The indicated inputs from keyboard 20 are understood to be input signals from keyboard 20 to processor 12. The parameters $screen-file and $databse are understood to be signals representing appropriate values of these parameters, input to processor 12 in any appropriate manner.

Outline. The signals representing the DD Screen-file 502, the meta-meta-database 504, the AB Screen-file 510, and the @Default screen-set 511 are provided in storage 17 before operation begins. Referring to FIG. 17, data processing system 10 first operates under the control of a first program module (DD Definition) 500 with respect to a first screen-file (DD screen-file) 502 and a first database 504, both to be described below. The data processing system advantageously employs the relational operator means described above and receives input signals from keyboard 20, which are interpreted by data processing system 10 operating according to module 500 in order to derive and store in the database storage, signals representing a second database 506, which will be described below.

Next, data processing system 10 operates under the control of a second program module (Application Builder) 508 with respect to a second screen-file (AB screen-file) 510 and a screen-set 511 called "@DEFAULT", both to be described, and with respect to database 506 constructed during the previous step. Data processing system 10 advantageously employs the relational operator means described above and receives input signals from keyboard 20, which are interpreted by data processing system 10 operating according to module 508 in order to derive and store in working storage signals representing a third screen-file 512, to be described below.

Finally, data processing system 10 operates according to an interpretor program, such as the PACE RUN module 514, with respect to the constructed screen-file 512 and the third database 516, employing the relational operator means described above, in order to permit interactive maintenance and use of databse 516 from the system terminal. The constructed screen-file 512 thus functions as an application program for the interactive use of database 516, as will be described.

The first database 504 is a meta-meta-database, that is, it comprises a generic description of any database definition (meta-database). It contains relations whose record occurrences are generic definitions of the elements of a database: files, views, records, and relationships. During operation of data processing system 10 according to module 500, the user provides names of relations, column or domain names, attribute definitions, field lengths and types, and all the necessary information about the particular database 516 whose record occurrences will ultimately be manipulated by the user, using the application program. The definition of the particular database 516 thus provided by the user, and forming database 506, may be called a "meta-database", that is, a description of a particular database. The meta-database 506 is itself a relational database.

By employing the described relational operator means, the data definition process may advantageously be accomplished interactively and nonprocedurally. The user need not learn a data definition language, or memorize names of data items or operations. Thus, nonprogrammers are enabled to perform data definition.

Further, the definition of built screen-file 512 may also be advantageously accomplished interactively and nonprocedurally by the employment of my relational operator means, and thus may be carried out by nonprogrammers. In effect, a nonprogrammer is thus enabled to create an application program.

Further, when the constructed application program is run (that is, when constructed screen-file 512 is employed to permit interactive maintenance of database 516), the plurality of operations, shown on the display and selectable by means of a PF key 204, in addition to the operations described above, includes a further type of operation generically referred to as a "descend" operation. This operation enables the user easily to obtain a display of record occurrences related to an initially displayed record occurrence, as will be explained.

Data dictionaries. Data dictionaries, or descriptions of databases, are in general well known in the database management art, and may be constructed in a number of ways. A data dictionary consists of descriptors of data attributes, such as names of fields and field lengths. In particular, the base tables, fields, keys, files, and view tables of the database are defined in the data dictionary.

Further, some prior art data dictionaries for a relational database have provided definitions of the relationships between the tables (relations), or in some cases the records, of the database.

Figure 23:
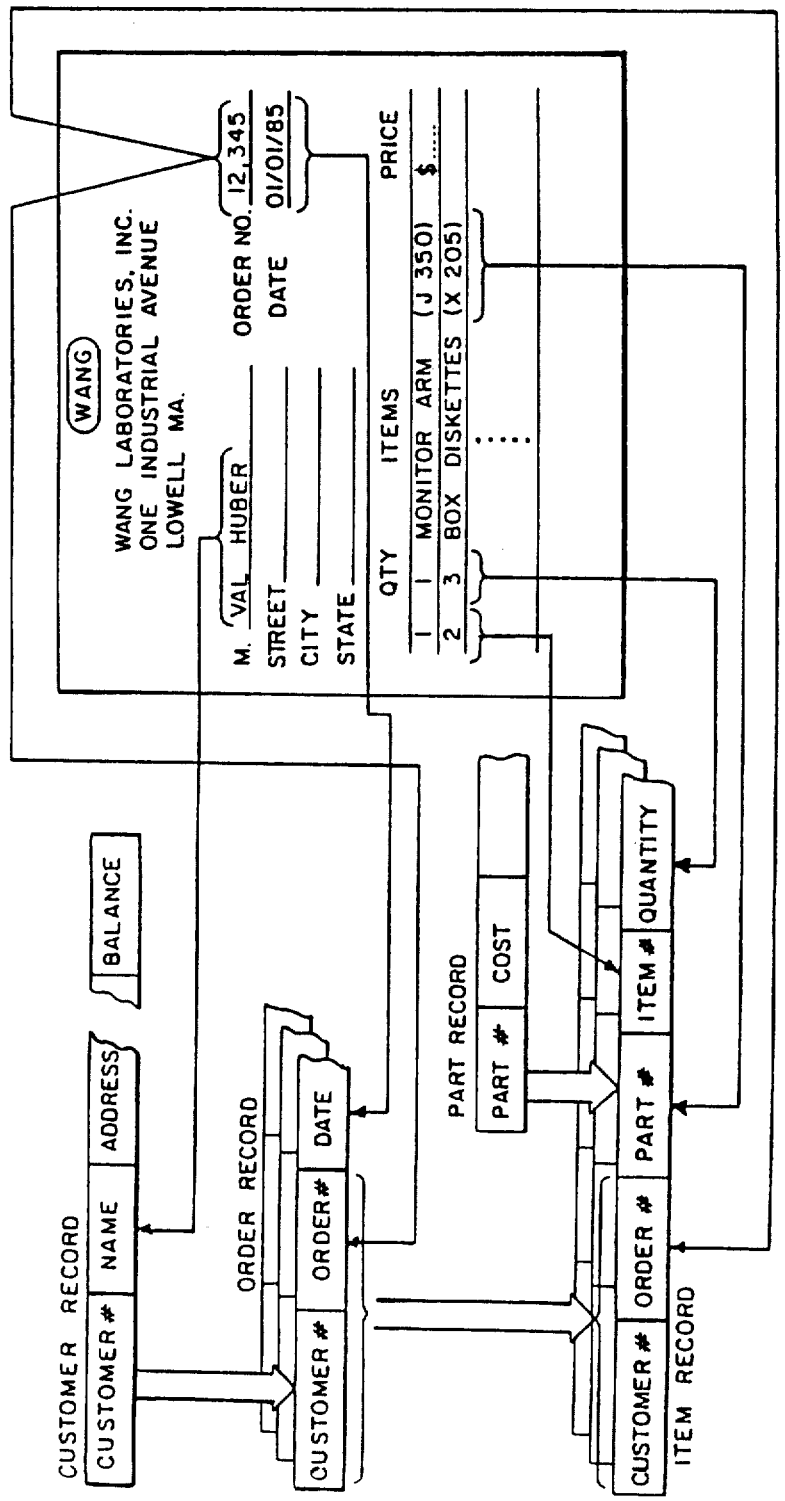
FIG. 23 is a conceptual showing of the relationships among certain exemplary database records.

Relationships. Referring now to FIG. 23, certain records of an imaginary database are shown by way of example. It is assumed that this database provides tables (relations) called Customer, Order, Item, and Part. Other tables may be present.

A record frm the Customer table (which comprises many such Customer records) includes the fields named Customer#, Customer Name, Address, and Balance, as well as others not here pertinent. It is assumed that the Customer# is a unique key in the Customer table, that is, its value uniquely identifies a customer. A record from the Order table (which comprises many such Order records) includes the fields Customer#, Order # and Date, with other fields not here pertinent. It will be apparent that if the value of the Customer# of a Customer record is the same as that of the Customer# of an Order record, this fact may be used to relate the Customer record to the Order record, or vice versa. The fact that a Customer# field is present in every Customer record and in every Order record relates the Customer table to the Order table. As there may be many Order record occurrences related to a single Customer record occurrence, the Customer record is defined as the "parent" or "owner" and the Order record is defined as the "child" or "member".

A database manager, having a database which already provides a Customer table, may define an Order table having the fields Order# and Date. In order to provide a relationship between the Order table and the Customer table, it is necessary that the Order record further include the Customer# of the customer to which that Order record is related. If this field is not already defined in the Order table, it must be added to support the relationship.

Further considering FIG. 23, an Item record is related to an Order record by two fields, the CustomerPt and the OrderPt. The values of both must coincide if a particular Item record is related to a particular Order record. There may be many Item records related to a single Order record. A Part record may be related to an Item record by the Part#; many Item records may be related to a single Part record.

Relationship attributes. As is known in the prior art, a relationship is defined by the attributes: name of parent record, name of child record set of parent relationship fields (must be a defined unique key) set of child relationship fields integrity rules (described below)

The parent relationship fields in the Order record of FIG. 23, for example, are the Customer# and the Order#. These are also the child relationship fields in the Item record.

Therefore, the process of definition of a relationship includes the following steps:

1. Define the parent relation and the parent relationship fields.

2. During the process of defining the fields in the prospective child relation, specify the parent table for the relationship. The parent table must have a defined unique key in each record occurrence.

3. Specify which unique key (if there is more than one) in the record occurrences of the parent table is to be used for the relationship. The field definitions of this key are copied into the definition of the child table.

4. Define integrity rules for the relationship. These may be provided as default rules, or modified by the user.

5. Continue with the definition of child table fields not participating in the relationship.

Integrity rules govern the addition, modification, or deletion of records in related tables. For example, if relationships are defined between customer and order tables in a database, an integrity rule can be defined such that a record occurrence cannot be added to the order table unless there is already present a record occurrence in the customer table to which the added order record can be related.

Two further attributes of a relationship are defined and signals representing them are stored in the Data Dictionary, namely the ascend and descend names of the relationship. The ascend name refers to the relationship when the user is viewing the child records; the descend name is used when the user is viewing the parent records. Thus, when viewing the Order table, the name of the relationship might be "Customer"; when viewing the Customer table, the name of the relationship might be "Orders". (Note that the relationship is one to many, Customer to Orders.)

However, the names of the relationship need not necessarily be the same as the names of the related tables. For example, if an Employee table and a Manager table are related as child and parent, the ascend relationship name might be "reports to" while the descend relationship name might be "supervises".

For convenience herein, the term "descend" is sometimes employed to refer generically to operations performed at run-time with respect to actual record occurrences, involving the relationship viewed from either direction.

Referring to FIG. 17, for each relation (base table or view) in database 516, there is provided a relation descriptor 570, which provides signals representing the name of the relation and other pertinent information, such as names of fields within it, types of fields, lengths of fields, and the like.

When all attributes have been defined, data processing system 10 assigns a relationship ID# to the set of attributes of each defined relationship; signals representing these attributes are stored in Relationship Attribute storage 520 within Data Dictionary 506 in storage 17, and are indexed by the relationship ID#. For each relationship in which the relation participates, the relationship ID# is included in the descriptor 570 for that relation.

Data Definition Module 500. Referring now to FIG. 17, the program storage portion of storage 17 provides a program module 500 called DD Definition.

The DD definition module can be constructed as a calling program to the modules (other than PACE RUN) shown in FIG. 17. That is, data processing system 10, during operation under the control of module 500, can operate according to the modules described above, which permit interactive definition of enumeratively defined result relations, with the selection of one of the selectable operations.

Specifically, when called by DD Definition module 500, the described relational operator means operates with respect to screen-file 502 in data storage 17, which provides a set of screen formats suitable for eliciting from the terminal user a definition of database 516, and with respect to the meta-dictionary 504. Screen-file 502 includes LIST, DISPLAY, and MODIFY type screen formats 503, with associated control signals 505 (POP tables, Screen Maps, and the like) all as described. (A LIST screen displays a list of record occurrences, while a DISPLAY screen displays more complete information (more fields) for a single record occurrence.)

FIG. 18 shows a LIST screen format from screen-file 502, used to display a list of all existing tables (named Customer, Item, Order and Part) in an exemplary database, together with the first thirty characters of each table's comment field. Actuation of PF key 204-10 on keyboard 20 when this screen is displayed results in a transition to the display of the complete comment field for a particular table (enumerated in the manner described above) using a DISPLAY format; the means for accomplishing such transitions have been described. Actuation of PF key 204-6 results in a transition to the display of an ADD screen format from screen-file 502, as shown in FIG. 19, also by means described.

Actuation of PF key 204-1 (Advanced Functions) when the LIST screen of FIG. 18 is displayed results in a transition to display of the Advanced LIST screen, with representations of PF keys 204 associated with another plurality of selectable operations (FIG. 20). (This transition, although not explicitly described, is accomplished by WZPXI module 114 in a manner similar to that described for similar transitions.) Among this plurality of selectable operations are several operations relating to the defining of relationships in which the listed tables participate. In particular, a selectable operation is provided for "Create Relationship".

Actuation of PF key 204-6 for Create Relationship during display of the Advanced LIST Tables screen results in a transition to display according to a screen format (not shown), which permits the user to define the attributes of the relationship. (In alternative embodiments this function might be accessed from a LIST Fields screen.) Signals representing such attributes are stored by data processing system 10 in Data Dictionary 506, within the data structure 520, "relationship attributes", indexed by the relationship ID#.

Operating according to naming module 526 of DD Definition module 500, data processing system 10 accesses within Data Dictionary 506 the definitions of the two related tables, retrieves the names of hte tables, and assigns the names of the tables as the default ascend and descend names of the relationship.

Figure 21:
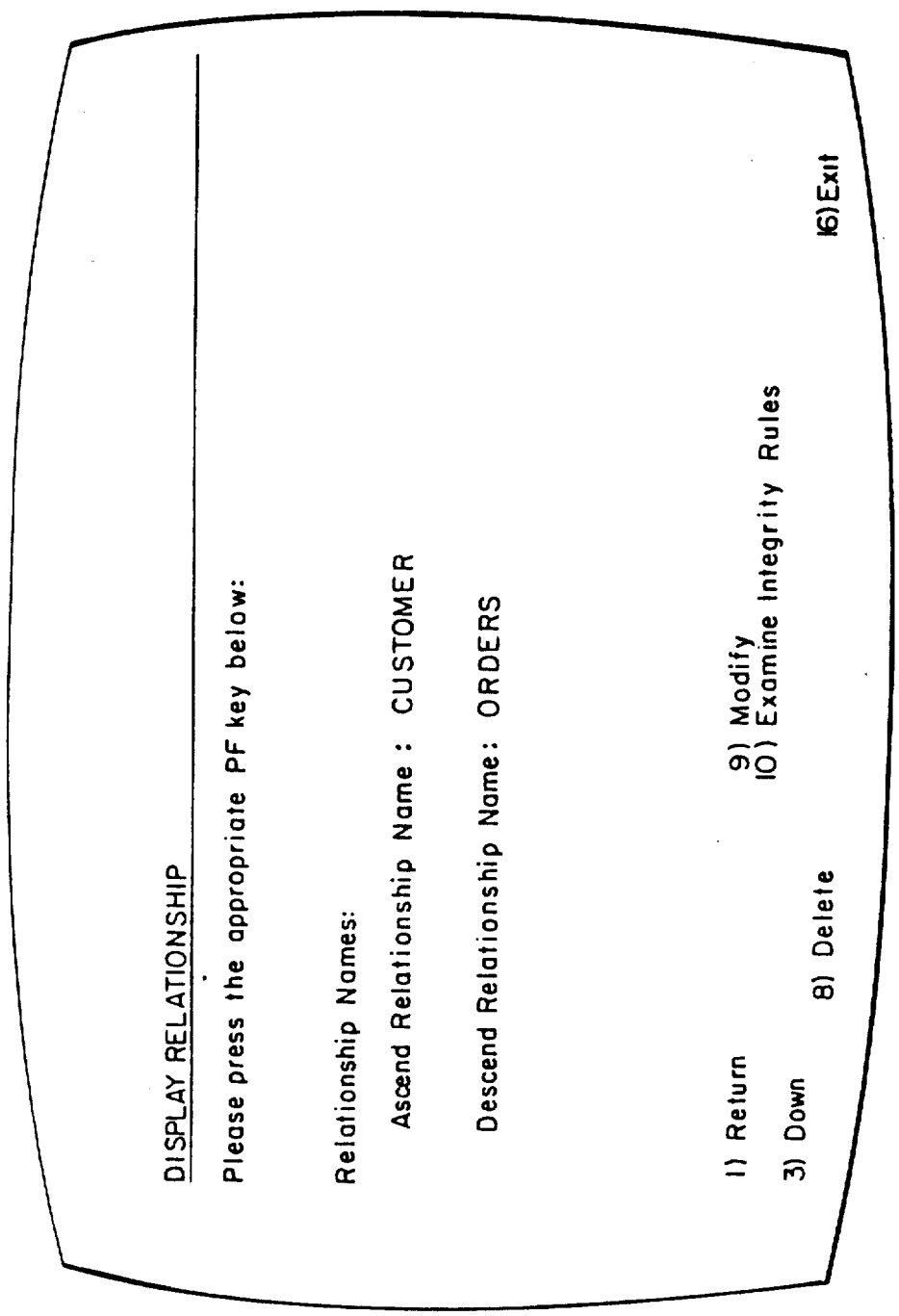

Actuation of PF key 204-9 during display of the Advanced LIST screen results in a transition to the DISPLAY RELATIONSHIP screen (FIG. 21). This screen provides a display of representations of the characters of the assigned ascend and descend names of the relationship. Actuation of PF key 204-9 (Modify) during display of this screen causes a transition to a MODIFY screen format (by means described above); in this format, representations of the characters of the ascend and descend names are displayed in open areas, that is, areas modifiable by the user through keyboard 20. The user can then use typewriter keys 200 of keyboard 20 to provide input signals representing modified relationship names. Signals representing the characters of the assigned (default) names or the modified names, if any, are stored in data element 524 of data structure Relationship Attributes 520, indexed by relationship ID#, within Data Dictionary 506 for database 516. The names of the relations which are related by attributes 520 are stored at 527.

When the construction of Data Dictionary 506 is complete, operation according to the next module 508 can begin.

Application Builder module 508. An Application Builder module 508 is provided in the program storage portion of storage 17. Operating according to this module, data processing system 10 may also advantageously employ the relational operator described above, which operates with respect to the meta-database 506 and AB screen-file 510 (FIG. 17). However, the operations performed by data processing system 10 to accomplish the functions described below may also be carried out by other suitable means. In outline, operating according to the Application Builder module, DP system 10 constructs within storage 17 a particular screen-file 512 tailored for the maintenance of one or more particular target relations within database 516. This operation will now be considered in greater detail.

Operation according to module 508 begins after the terminal user has selected a database. The database must have been defined; that is, its meta-database or Data Dictionary 506 must have been defined and signals representing it stored in storage 17 in the manner described above, and in particular, the ascend and descend names of all defined relationships must have been defined and representations of the characters of the names stored at 524.

Data processing system 10 under the control of Application Builder module 508 operates with respect to the input parameters $database and $screen-file. The particular value of $database designates the database 516 to be managed by the application program; the Data Dictionary 506 for that database is accessed. The particualr value of $screen-file designates the AB screen-file 510.

The @Default screen-set 511 is also accessed. Screen-set 511 provides archetype (default) screen formats 521 for each screen-type (LIST, DISPLAY, SELECT, ADD, MODIFY, DELETE) and an archetype POP table 509 associated with each screen format. The archetype screen formats are similar to those shown in FIGS. 20 and 25 but lack specific representations of the target relation name and the column or domain names, and other information regarding the PF keys. Such representations are replaced by open elements. The POP table 509 specifies which PF keys 204 can be represented on a particular format, and includes for each PF key signals necessary for carrying out the operation selected by that key. The POP table is not complete, in that PF keys for descend operations may be added at a later stage, as will be described.

Since screen-set 511 is provided separately from AB Screen-file 510, the formats 523 can be edited globally by the user; for example, the language of the fixed text can be changed. A particular @Default screen-set 511 is associated with a particular Data Dictionary 506.

Figure 16:
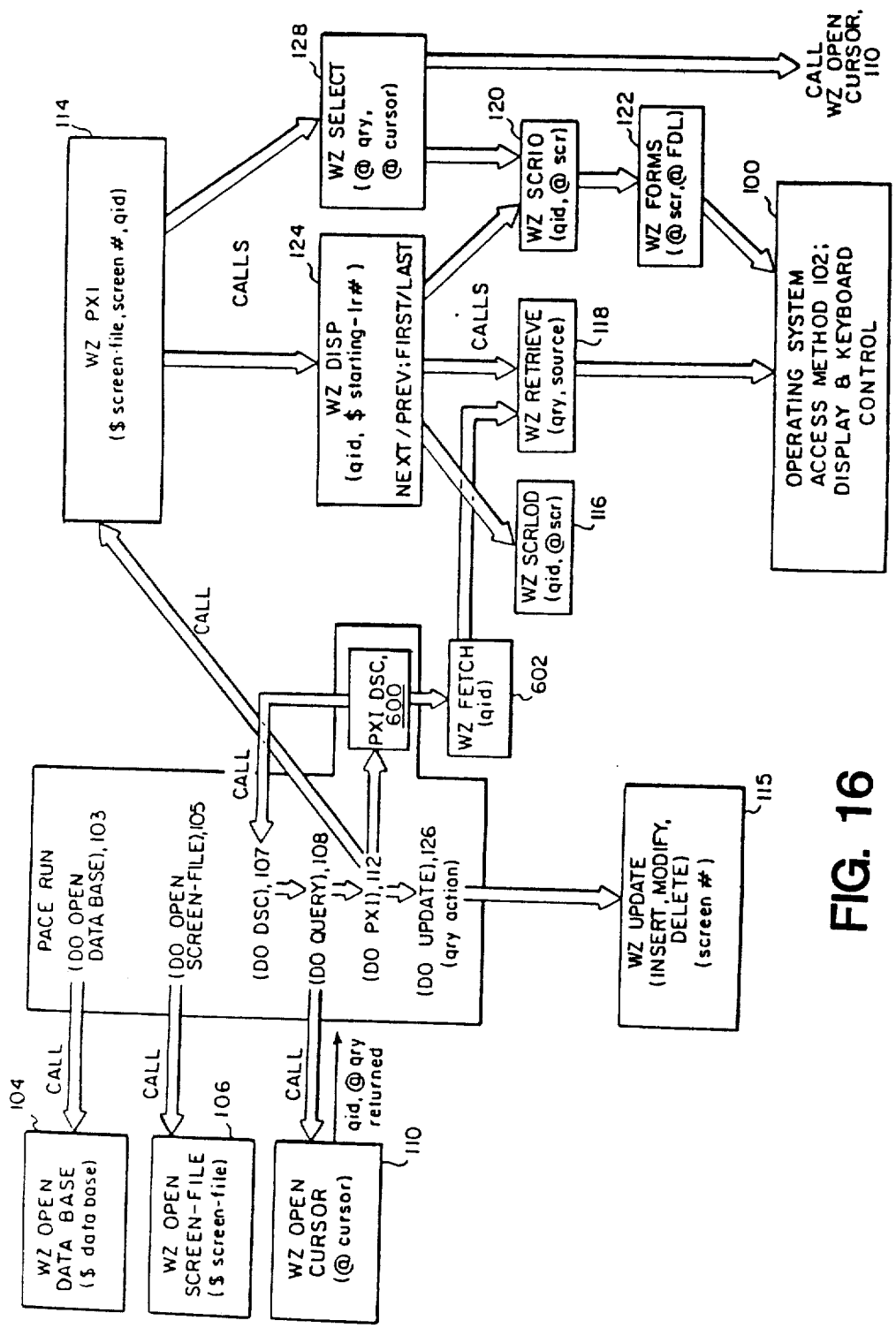
FIG. 16 shows the allocation of part of the program storage portion of the storage of the data processing system of FIG. 1, relating to one aspect of the system.

Screen-file 510, with respect to which data processing system 10 operates according to the modules of FIG. 16 when called from Application Builder module 508, provides AB screen formats 523, used for the display of record occurrences retrieved from Data Dictionary 506, with associated control signals 525 comprising POP tables, Screen Maps, For-Display-Lists, and other data structures as described in more detail above.

Figure 24:
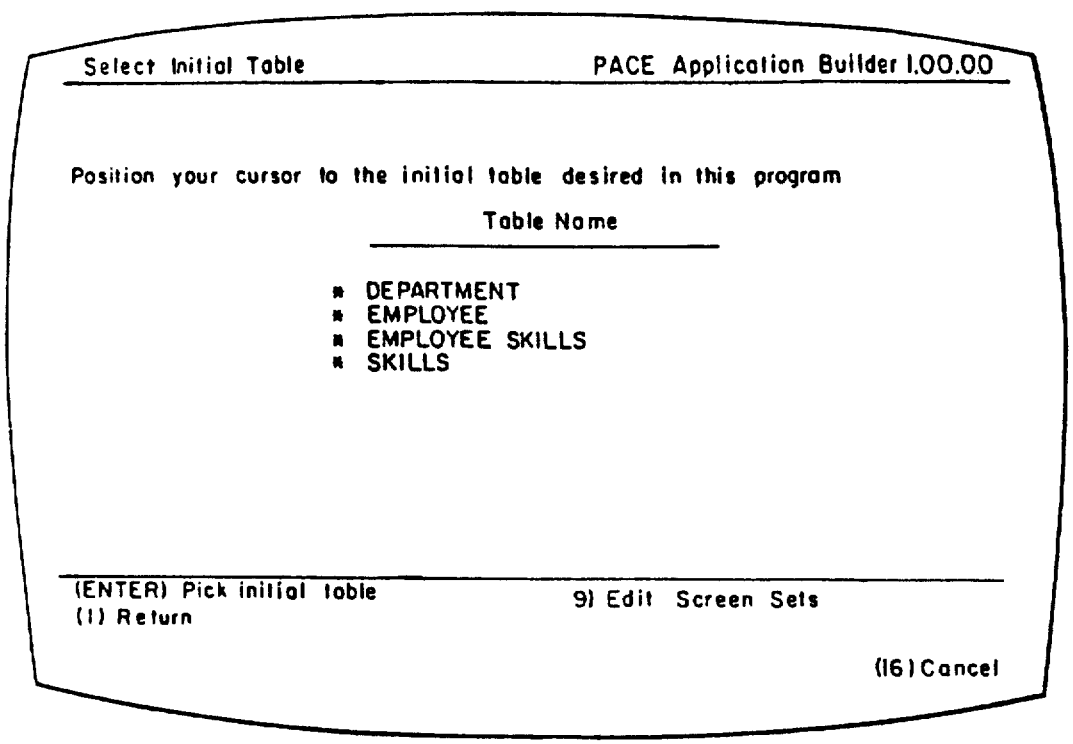
FIGS. 24 and 25 show in detail certain further screen formats employed in the system described.

Operating first according to the Display module 550 of Application Builder module 508, and using the input parameter $database, designating the database 516, data processing system 10 (advantageously employing the relational operator means described above) retrieves from Data Dictionary 506 signals representing a list of names of relations (base tables or views) in database 516. Representations of the names are displayed in a first screen format from AB formats 523, as seen in FIG. 24. By positioning the screen-position-marker and actuatng the ENTER key 206 (FIG. 5), the user can select an initial table.

Operating further according to module 550 of module 508, data processing system 10 uses the name of the selected initial table to obtain from the descriptor 570 for that table, a list of relationship ID#s for relationships in which that table participates. The relationship ID#s are used to index data structure 520 in Data Dictionary 506, and to retrieve signals representing the names of the related tables from 527. Representations of the names are displayed in a second screen format from AB formats 523, as seen in FIG. 25.

By actuating ENTER key 206 and positioning the screen-position-marker by means of keys 208 (FIG. 5), the user can select one or more related tables (relations) for inclusion in the application program. In the present description, the table Which is initially displayed (or whose name is initially displayed) is referred to as a "starting" relation, while a selected related table which is subsequently displayed (or whose name is subsequently displayed) is referred to as a "destination" relation.

Figure 25:
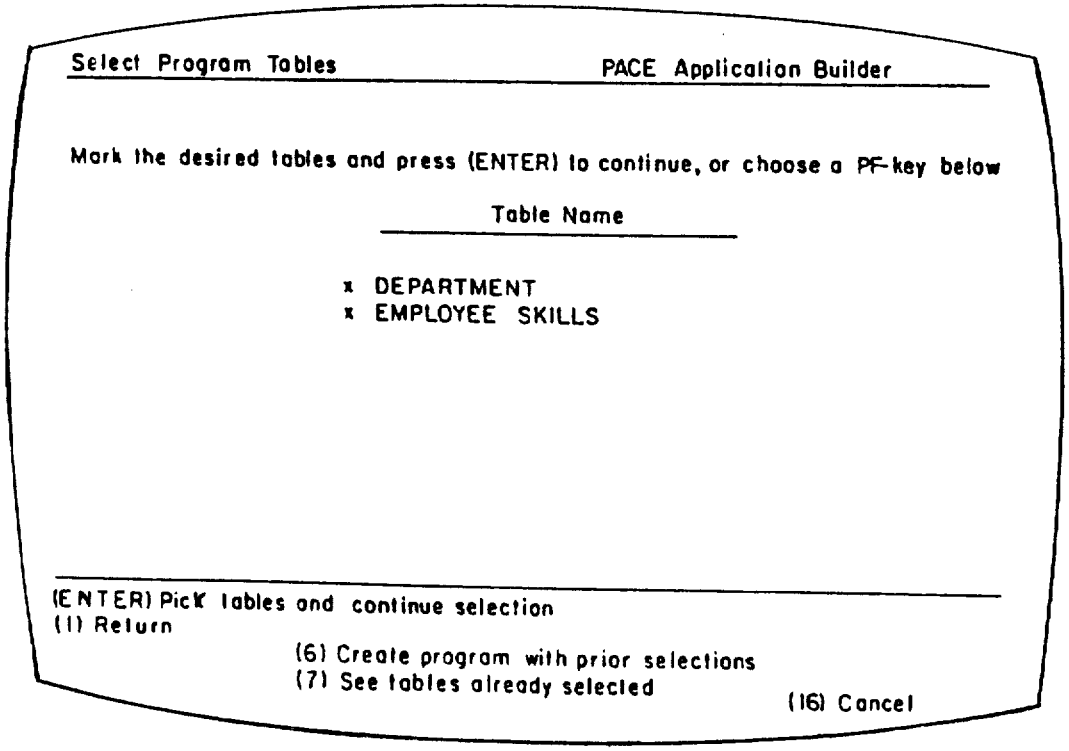

This process is repeated until either there are no related tables unselected, or the user actuates PF key 204-6 (Create Program) during display of the screen format of FIG. 25.

The archetype screen formats 521 in screen-set 511 are next copied for modification. Signals representing the selections made by the user during previously described displays are then used by data processing system 10, operating according to Create Screen-file module 552, to modify the copied archetype screen formats 521 to define screen-sets for all selected tables. A screen-set 522 is provided for the "starting" relation, and a screen-set 532 is created for each "destination" relation. The signals stored in Data Dictionary 506 are retrieved and used at this time to provide for the representation of screen fields, column headers, prompts, and other fixed text. The modified screen formats of 522 and 532 are stored as part of constructed screen-file 512.

In addition, Create Screen-file module 552 provides means for constructing, by referring to the archetype POPs 509 and the Data Dictionary 506, within screen-file 512 the associated control signals at 530 and 534 comprising POP (Procedure Operation) tables, PSMPS (Procedure Screen Maps), and other elements, associated with the defined screen sets and required for the proper use of such screen sets. For example, such Data Dictionary stored signals as those defining the type and length of the fields are retrieved and used to construct an appropriate Screen Map.

In this process, the relationship attributes of 520 are used in three ways. First, the screen formats 522 in the screen set for the starting relation are modified to provide for the display of the representation of a PF key 204 in association with the name of the relationship (from 524) to the destination relation. Since the name of the starting relation is known, the appropriate ascend-/descend name can be selected for the direction of the relationship. Further, the POP table within control signals 530 for each screen format 522 is modified to include signals representing an oper defined for that PF key. The oper.action is "descend# via screen#"; the oper.name is the name of the relationship, copied from data storage element 524. Each descend operation is uniquely identified by "descend#", which indexes a unique PDSC data structure 538 (described below). There may be more than one descend transition defined on a given screen-format; each is identified by a unique descend# in the pop.oper.action.

Second, an additional screen-set 532 is constructed in screen-file 512, by modifying a copy of the archetype screen-set 521 in accordance with the information in Data Dictionary 506 describing the destination relation (screen fields, relation name, column names, and the like) as described above. Appropriate POPs, PSMPs and other control data structures are defined and signals representing them are stored in screen-file 512 at 534.

Third, operating according to Application Builder module 508, data processing system 10 builds (allocates storage and stores signals therein) a PDSC data structure 538 within screen-file 512. A particular PDSC data structure is built for each selected transition from a first or "starting" relation to a second or "destination" relation, and is identified, as stated above, by a unique descend#.

Figure 22:
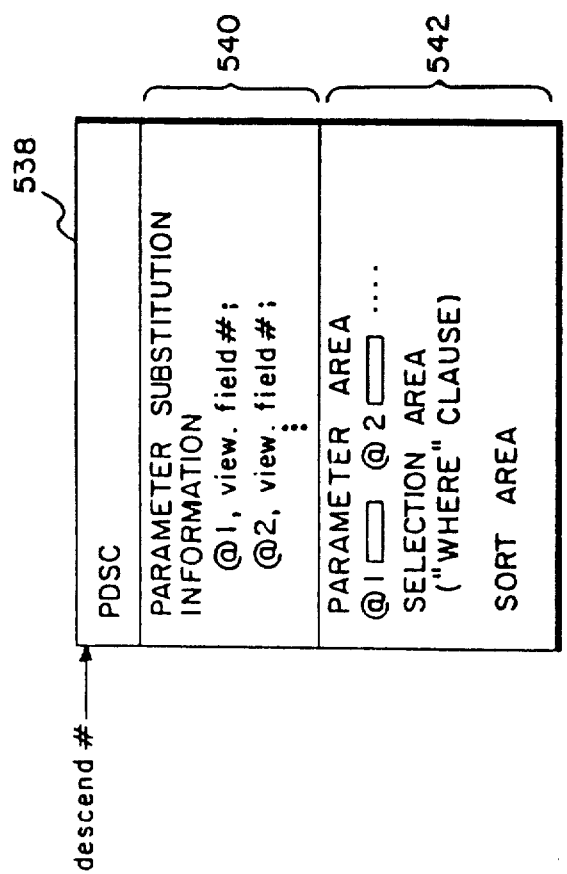
FIG. 22 shows a part of FIG. 15 in more detail.

Referring now to FIG. 22, PDSC data structure 538 comprises two portions 540 and 542. Portion 540 provides signals representing control information; the second portion provides signals representing a cursor defined against the destination relation, but not completely specified. The selection area or "where clause" of this cursor includes one or more locations identified by parameters @1, @2, . . . , while the signals of control portion 540 are employed (at a later time, as will be explained) by data processing system 10 to obtain signals to be placed in the locations, representing values for the parameters. Specifically, the parent relationship fields must be copied into the cursor at the @1, @2 . . . locations in order to retrieve related child record occurrences through this cursor. In constructing PDSC data structure 538, the specification of fields identified by parameters @1, @2 . . . and of the control information signals in portion 540 is derived from the attributes of the relationship stored at 520 in Data Dictionary 506 within storage 17. The function of the parameters @1, @2 . . . will become clear in what follows.

PDSC data structure 538 is stored in built screen-file 512.

By selecting an initial table, from the display of FIG. 24, the user defines a value for "Initial Table" within data structure PDEF 153 in Screen-file 512. A default order of screen-format presentation is defined by data processing system 10 operating according to Create Screen-File module 552.

Advantageously, a further module 554 "Screen Edit" may be provided in Application Builder module 508. Actuation of PF key 204-9 "Edit Screen Sets" during display of the screen format shown in FIG. 24 causes data processing sytem 10 to operate according to this module, and under its control, representations of the screen formats 522 and 532 are displayed to the user in "prototype" form, that is, with specific headers and relation names taken from Data Dictionary 506, but with X's or other symbols representing the record occurrences. No record occurrences are actually retrieved from database 516 at this time. Appropriate means for editing the appearance of the screen formats is provided; in addition, the order of presentation of the formats may be changed by the user. The presentation of PF keys on each format may also be edited; for instance, to prevent deletion of record occurrences at a later time, the PF key for the Delete operation can be removed from the format.

Interpretation of constructed program. When the built screen-file 512 has been completely defined and signals representing it have been stored in the working storage portion of storage 17, it constitutes in effect an application program for the interactive, nonprocedural maintenance of the database 516 for which it was constructed. When it is desired to use this application program, an interpreter must be employed, and in particular, the PACE RUN module serves as such an interpretor. For the purpose of interpreting the signals representing the "descends", two additional program modules are provided in program storage portion of storage 17: PXIDSC module 600 and WZFETCH(qid) module 602. Additionally, the DO DSC module 107 within the calling program calls the DO QUERY module 108.

WZFETCH module 602 calls WZRETRIEVE module 118 to retrieve a single record occurrence from database 516, without displaying it. The parameter "qid" identifies the query to be used in the retrieval. Other particular features of the FETCH module are not pertinent herein.

When the constructed application program is run, data processing system 10 operating according to the PACE RUN module in the manner described accesses and opens screen-file 512. The signals stored in PDEF 153 are used to access an initial screen format 522 and initial relation (table) from database 516. If the format was so modified during the previous operation of the data processing system according to Application Builder module 508, the initial screen format includes a representation of a PF key 204 for a descend transition to a display of a related relation. Record occurrences defined by cursor 158 are retrieved from the initial target relation and merged with 6he initial screen format to define a stored screen image.

As described above, the stored screen image is displayed, and signals representing either enumeration or characteristic selection of a result relation are input through keyboard 20 and stored in working storage 17. Input signals representing selection of an operation by actuation of a PF key 204 on keyboard 20 are stored in the data element for.fpf-key within FOR data structure 164.

When the operation selection signals input by the user through keyboard 20 represent actuation of the PF key 204 corresponding to a specific descend transition, data processing system 10 operating according to WZSCRIO module 120 copies the signals representing the pop.oper for that PF key into QUERY.oper, as has been explained. The oper.action for that PF key into QUERY.oper, as has been explained. The oper.action for that PF key is "descend# via screen#", identifying the particular PDSC structure 538 within screen-file 512 that corresponds to that descend transition. Data processing system 10 then returns to DO PXI module 112, with signals representing the action "descend#" stored in data element ATAB 172.

Operating according to DO PXI module 112, data processing system 10 tests the signals in ATAB 172, as described above. In this case, in response to signals representing the action "descend#", data processing system 10 operates further according to the module PXIDSC 600 to call FETCH(qid) module 602, which calls RETRIEVE module 118.

Figure 15:
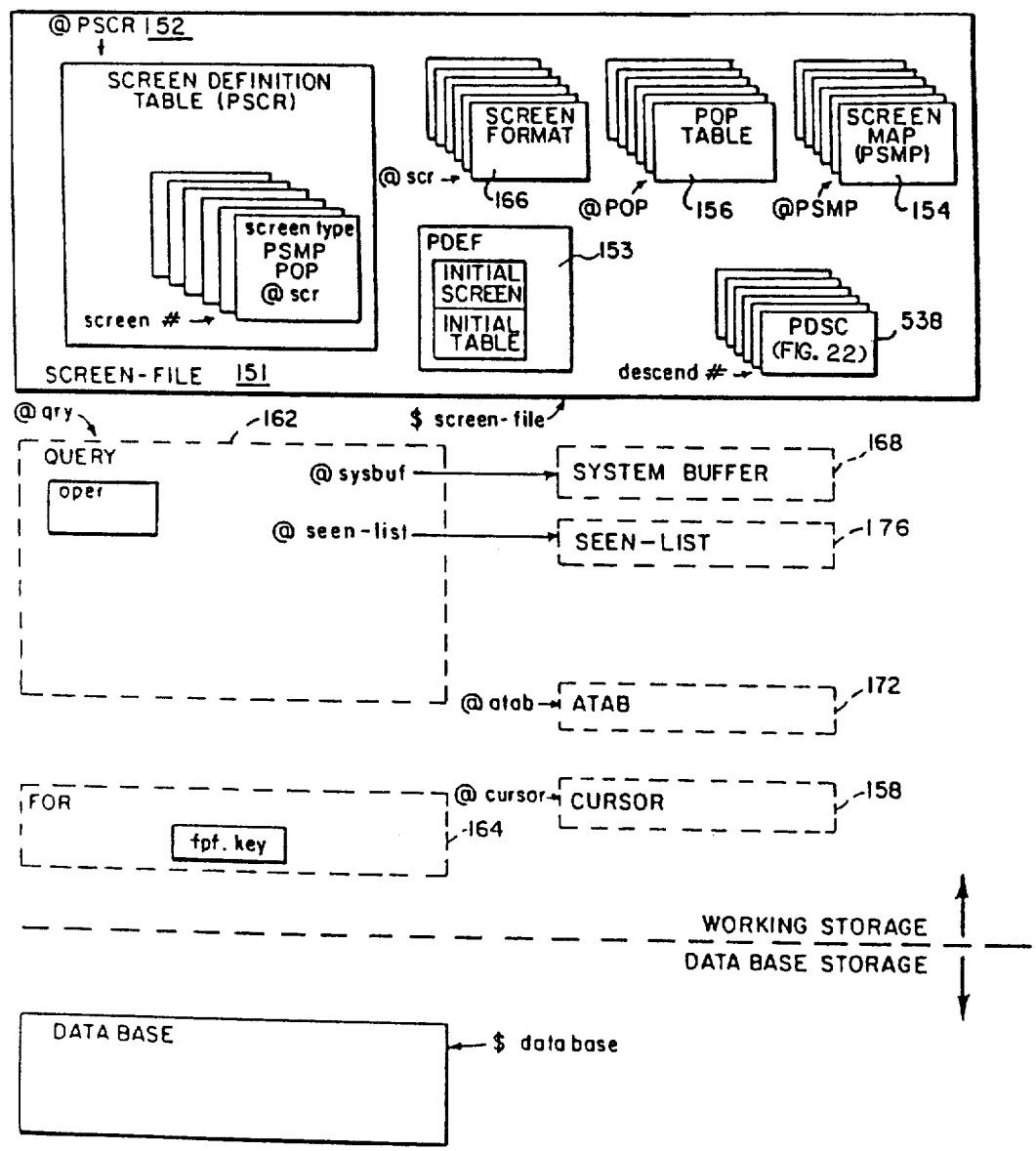
FIG. 15 shows the allocation of part of the data storage portion of the storage of the data processing system of FIG. 1.

Operating according to RETRIEVE module 118 and according to the stored signals defining the result relation (either the marked records in Seen-List 170 or the modified cursor in data structure 158, as described above), data processing system 10 copies from database 516 signals representing the first record occurrence in the result relation. Since the result relation is defined from the "starting" relation, the record occurrence retrieved in response to FETCH is a member of the starting relation, defined by the modified query identified by qid. The retrieved record is not displayed; it is stored in System Buffer 168 (FIG. 15). When the record has been retrieved, PXIDSC 600 calls DO DSC module 107.

Data processing system 10, operating according to DO DSC module 107 and accessing the first portion 540 of PDSC data structure 538, copies from the retrieved record occurrence, signals representing the values of the relationship fields, to the locations indicated by the corresponding parameters @1, @2 . . . within second portion 542 of PDSC 538 as defined by first portion 540. The copied fields are the keys which are present in both the parent records and the related child records, as previously described. Therefore, the values of these fields are effective to define which are the related record occurrences in the destination relation. The operation completes the cursor provided by PDSC 538. The cursor is now completely defined against the "destination" relation.

Signals representing the completed cursor from PDSC 538 are now placed within a CURSOR data structure 158, and the module DO QUERY is called to open the cursor and define a new QUERY data structure 162 corresponding to the new cursor, all as described above. (The cursor defined against the "starting" relation remains open.) The current screen-file continues to be accessed; the new screen# is provided from the descend action (descend# via screen#). Operation of the data processing system according to this module, with respect to a particular cursor, has been explained in detail.

The result in the present case is that the records in the "destination" relation, defined by the cursor (provided by PDSC 538 and completed with specific relationship field values from the retrieved record occurrence from the "starting" relation), are sequentially retrieved from database 516, merged with a screen-format of screen-set 532 within screen-file 512, and displayed to the user on display 18. The user can actuate PF keys 204 in the manner described, in order to modify the record occurrences whose representations are displayed; for example, the user can update or delete occurrences, or can add new ones to the "destination" relation of database 516.

When the user has viewed as many of the record occurrences within the "destination" relation as is desired, and has performed any desired operations on them, actuation of the Return PF key 204-16 causes DOQUERY module 108 to return to its caller. Alternatively, when all record occurrences within the destination relation have been viewed, such return is accomplished automatically by unstacking the recursion. The next record occurrence of the "starting" relation is then retrieved by FETCH module 602. The descend process is now repeated for the record occurrences from the "destination" relation related to the next record occurrence of the "starting" relation. When all related record occurrences for all the record occurrences of the starting relation have been viewed, operation according to WZPXI module 114 with respect to the cursor for the starting relation is resumed. The LIST screen is redisplayed, with members of the starting relation represented on it.

Operation. An example of the above operation will be described, referring now to the exemplary records shown in FIG. 23. Operating according to DD Definition module 500 and to input signals from keyboard 20, data processing system 10 constructs a Data Dictionary 506 for the "Sales" database 516. During such construction, a relationship is defined by the user between the Customer records and the Order records. The customer table is defined as the parent table; the Customer# field is defined as the parent relationship field. Signals representing these definitions are stored in attribute storage 520; further, "Customer" is stored as the ascend name, and "Orders" as the descend name, of the relationship, and signals representing the characters of these names are stored at 524. A relationship ID# is assigned to these attributes, and is an index to relationship attribute storage 520. The ID# is stored in a descriptor 570 for the Customer table, and also in a descriptor 570 for the Order table.

Next, operating according to Application Builder module 508, and according to input signals from keyboard 20, data processing system 10 accesses AB screen-file 510 and Data Dictionary 506 for the "Sales" database 516. Data processing system 10, operating according to module 550, and employing the relational operator described above, displays a list of table names (Customer, Order, Item, and Part) retrieved from Data Dictionary 506, in a format (such as that of FIG. 24) from AB Screen-file 510. The Customer table is selected by the user as the initial table; signals representing this table are stored in "Initial Table" of PDEF data structure 153.

Data processing system 10, further operating according to module 550, accesses the descriptor 570 of the Customer table in Data Dictionary 506, and using the Relationship ID# (or ID#s) found therein, accesses the relationship attributes storage 520. The name of each table in the database 516 that is related to the Customer table (in this case there is only one, the Order table) is displayed on display 20 in a format like that of FIG. 25. The Order table is selected by the user as a related table to be included in the application program.

The LIST screen format is selected by the user as the initial screen; signals representing this format are stored in "initial screen" of PDEF data structure 153. Data processing system 10, operating according to module 552, and referring to Data Dictionary 506, accesses the @Default screen-set 511 and copies and modifies formats 521 and POPs 509. (Other control data structures, such as Screen Maps, are also constructed at this time.) Specifically, the archetype LIST format is modified for the Customer table to provide a PF key (for illustration, PF key 204-11) associated with the characters "Orders", retrieved from data element 524, indexed by the Relationship ID#; the POP table for that screen is modified to include a pop.oper "descend#1 via screen#". (The value of screen# is assignable by the user; it is assumed that the LIST screen is selected for the descend operation.) A PDSC data structure 538 is constructed for descend#1. This PDSC structure in its first portion 540 contains the pair, "@1, customer.customer#". That is, the customer# of the Customer record is the relationship field for this relationship, as is found from the signals stored in the attributes for the relationship between Customer and Order tables, indexed by Relationship ID#. In second portion 542 of PDSC 538 is provided a cursor, defined against the Order table of database 516, but with the relationship field incomplete, and indicated by @1.

Finally, the archetype screen-set formats 521 and associated POPs 509 are copied and modified to construct for the destination relation the formats 532 and control signals 534. The remainder of the built screen-file 512 (if any) is constructed, and is edited by the user as desired.

At a later time, a user of the data processing system terminal initiates operation according to PACE RUN 514 and built screen-file 512. According to the signals in PDEF data structure 153, and employing the relational operator decribed above, data processing system 10 operates to display the LIST screen format from formats 522 with record occurrences from the Customer table. This display includes among the representations of the selectable operations the characters "11) Orders". The user enumerates particular listed Customer record occurrences in a manner described above, and actuates PF key 204-11. In the manner described above, the signals representing actuation of this PF key are employed to retrieve from the POP table for the LIST screen format 522 the corresponding pop.oper, which is copied into qry.oper. The qry.oper-action is "descend#1 via LIST screen"; this is copied to ATAB data structure 172.

Operating according to PACE RUN, data processing system 10 employs the signals representing "descend#1" to access the PDSC data structure 538 previously built for this descend operation. The first of the enumerated Customer records (from the initial LIST screen) is fetched from database 516 and stored in System Buffer 168. The value of its Customer# field is copied to the location in PDSC portion 542 indicated by @1, thus completing the cursor. DO QUERY module 108 is then called for operation with respect to this cursor, in the manner described above. Order record occurrences for which the Customer# relationship field has the value that has been copied from the Customer record in the System Buffer are retrieved, and are displayed to the user on a LIST screen format 532.

The user can operate upon the listed Order record occurrences in the manner described. Specifically, the user can modify or delete such record occurrences, or the user can add new record occurrences (subject however to the integrity rules in the relationship attribute storage 520, which are enforced in a manner not described herein). When all such desired operations have been performed, the next enumerated Customer record from the initial LIST screen is fetched, and its Customer# is copied to the @1 location of the cursor portion 542 of PDSC data structure 538. The Order record occurrences defined by this cursor will then be retrieved. This process continues until it has been performed with respect to all enumerated Customer records from the initial LIST SCREEN.

Thus the operations which users most commonly desire to perform upon a database can all be accomplished, interactively and nonprocedurally, through the operation of the application program in the form of the built screen-file 512.

Referring now in particular to FIG. 26, the program modules for which storage is allocated in the program storage, as shown in this Figure, have been described, with the exception of WZFETCH module 602.

Figure 27:
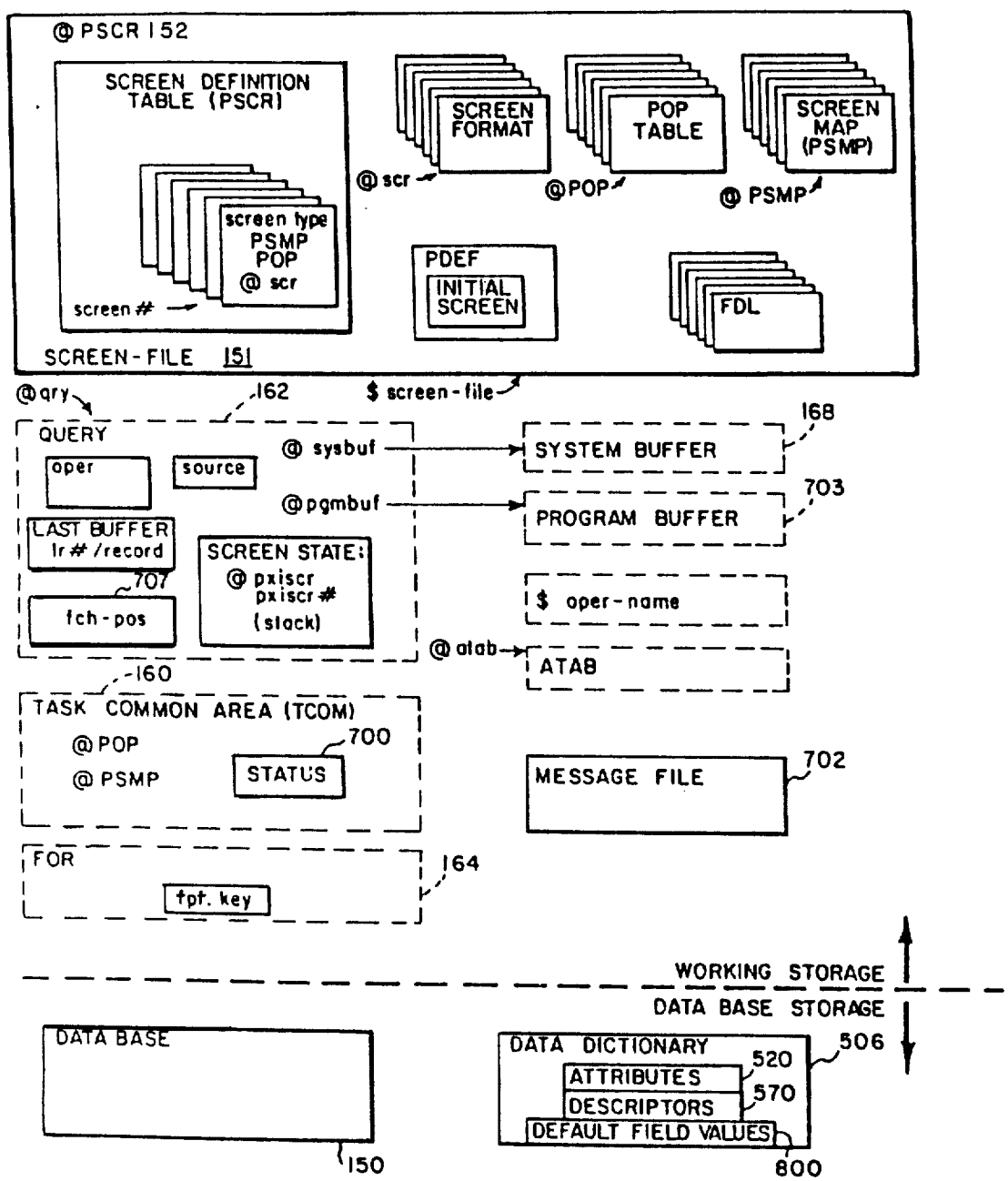
FIG. 27 shows the allocation of working storage.

Referring to FIG. 27, the data structures for which storage is allocated the the working storage of FIG. 27 have been described above, with certain exceptions to be described below. In particular, the TCOM data structure 160 further comprises signals representing Status data structure 700, and the QUERY data structure 162 further comprises signals representing a fetch position (qry.fch-pos 707) and a pointer @pgm-buf. A Program Buffer 703 is provided in working storage, pointed to by @pgmbuf in QUERY data structure 162. A Message File data structure 702 is provided in working storage. A Data Dictionary structure 506, more fully described above, provides relationship attributes 520 for each relationship defined in the representations of the screen formats 522 and 532 are displayed to the user in "prototype" form, that is, with specific headers and relation names taken from Data Dictionary 506, but with X's or other symbols representing the record occurrences. No record occurrences are actually retrieved from database 516 at this time. Appropriate means for editing the appearance of the screen formats is provided; in addition, the order of presentation of the formats may be changed by the user. The presentation of PF keys on each format may also be edited; for instance, to prevent deletion of recrod occurrences at a later time, the PF key for the Delete operation can be removed from the format.

Referring now to FIG. 27, the TCOM data structure 160 further comprises signals representing Status data structure 700, and the QUERY data structure 162 further comprises signals representing a fetch position (qry.fch-pos 707) and a pointer @pgm-buf. A Progam Buffer 703 is provided in working storage, pointed to by @pgmbuf in QUERY data structure 162. A Message File data structure 702 is provided in working storage. A Data Dictionary structure 506, as described above, provides relationship attributes 520 for each relationship defined in the database, and descriptors 570 for each relation (table) in the database. In the preferred embodiment, the Data Dictionary is itself modeled as a relational database and provided in database storage, but this is not essential to the present invention.

Figure 28:
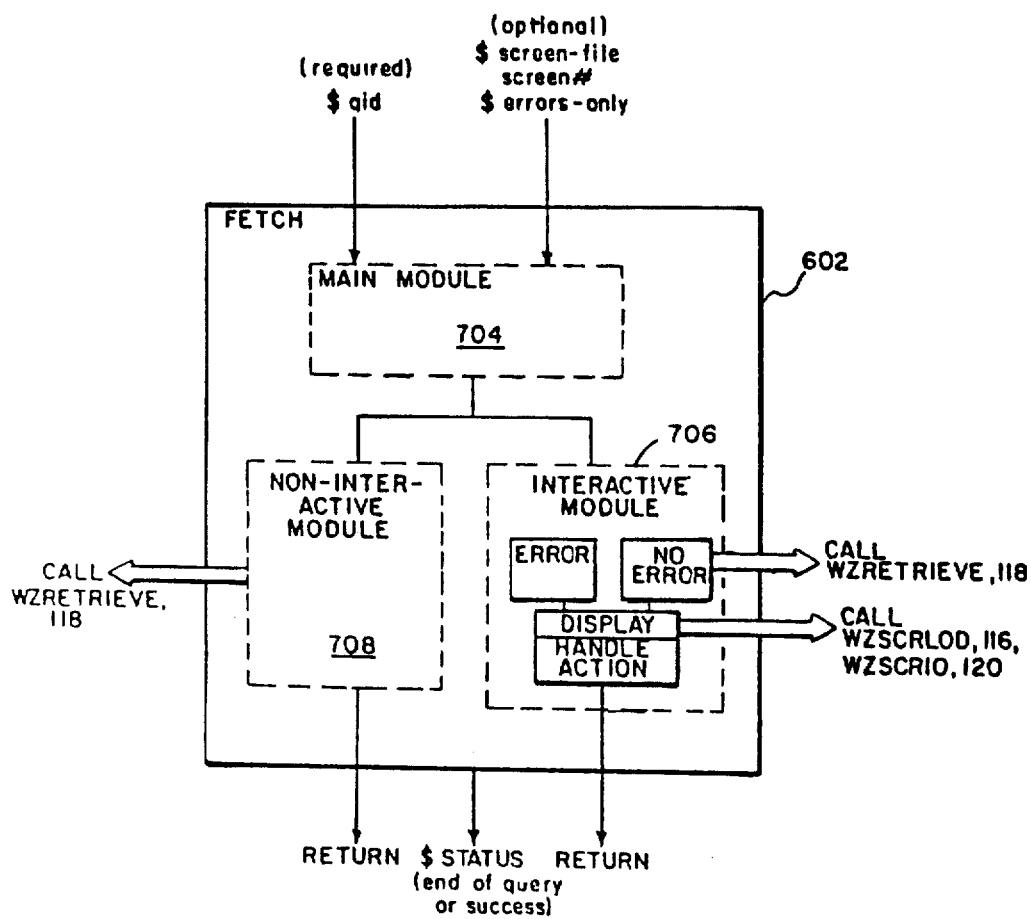
FIG. 28 shows the WZFETCH module of FIG. 26 in greater detail.

Referring now to FIG. 28, the structure of the WZFETCH means 602 is shown in greater detail. A required input signal to data processing system 10 when operating according to WZFETCH is the parameter $qid, which identifies the query 162 (FIG. 27) (and by implication the cursor) which specifies the particular record occurrence or occurrences to be obtained from the physical database 150. The data processing system cannot operate according to WZFETCH without this parameter. There are in addition three optional parameters: $screen-file, screen# (or $screen-name), and $errors-only. The first two of these parameters identify the particular screen format signals (166 of FIG. 27) to be used to control display 18. The $errors-only parameter can have one of two values (yes or no), and its signifance will be explained below.

WZFETCH comprises three structures: a Main module 704, an Interactive module 706, and a Non-interactive module 708.

Operating according to Main module 704, data processing system 10 operates to test whether signals representing the $screen-file and screen# parameters have been provided to WZFETCH, and whether the value of the $errors-only parameter is "yes" or "no". The following conditions are recognized.

First, if no screen format has been identified, data processing system 10 operates according to the Non-interactive module 704. If a screen-format has been identified, and if $errors-only=yes, then data processing system 10, operating under control of Main module 704, tests signals provided in the Status structure 700 of TCOM data structure 160 (FIG. 27). These signals are provided in a manner to be explained. If the value represented by these signals indicates an error, previously detected in a manner to be explained, then data processing system 10 operates further according to Interactive module 706. If the value represented by the Status structure signals indicates no error, then data processing system 10 operates further according to Non-interactive module 708.

Finally, if a screen format has been identified and $errors-only =no, data processing system 10 operates further under control of the Interactive module 706.

Non-interactive module 708 calls WZRETRIEVE module 118 (FIG. 26); operating according to module 118, as has been explained, data processing system 10 calls the operating system access method to copy from database 150 signals representing a record occurrence defined by the current cursor. The copied signals are placed in System Buffer 168 (FIG. 27). Upon return to Non-interactive module 704, data processing system 10 operates to copy the retrieved signals into Program Buffer 703 (FIG. 27), and increments the qry.fch-pos signals in 707. System 10 then returns to operation according to whatever module called WZFETCH, as will be described.

Alternatively, operating according to Interactive module 706, data processing system 10 first derives from the input parameters $screen-file and screen# signals for accessing the screen format signals 166 to be used to control display 18. If necessary, data processing system 10 calls WZ OPEN SCREEN-FILE module 106 (FIG. 26) at this time. Next, data processing system 10 tests the signals comprising Status data structure 700 in TCOM 160.

If these signals do not indicate that an error has previously been detected (in a manner to be explained), then data processing system 10 calls WZRETRIEVE module 118, as in non-interactive module 708, to copy from database 150 signals representing a record occurrence specified by the query identified by $qid and pointed to by qry.fch-pos. System 10 then copies the signals from System Buffer 168, where they were placed by system 10 during operation according to WZRETRIEVE, to Program Buffer 703, and increments the signals comprising qry.fch-pos 707.

If the Status data structure signals at 700 indicate that an error has previously been detected, then data processing system 10 copies signals representing the previously retrieved record occurrence from System Buffer 168 to Program Buffer 703. WZRETRIEVE is not called.

In either case, data processing system 10 next operates according to screen services WZSCRLOD and WZSCRIO modules 116 and 120, as described above, which control the data processing sytem including display 18 to display representations of the record occurrence in Program Buffer 703.

In the error case, an error parameter signal, derived from the Status signals at 700, is employed by data processing system 10, operating according to the screen services modules, to copy from Message File 702 signals representing displayable characters comprising an error message appropriate to the particular error. Thus representations of the record occurrence and the error message are displayed on display 18 according to format signals 166.

In either interactive case, as explained above, signals representing a screen image are stored, and are employed by data processing system 10, under the control of operating system 100, to control display 18. At this time, the interactive user of the data processing system can actuate keys on keyboard 20, effective to modify the stored screen image signals, and to input operation selection signals representing a selected operation.

During operation of the data processing system according to WZSCRIO module 120, and according to WZFORMS module 122 called therefrom, errors of the kind described above as violation of field constraints are detected. For example, if the user attempts to modify the screen to show representations of alphabetic characters in a field which is specified, in descriptor 570 for the record, as numeric, this error will be detected, and a representation of a message (from message file 702) will be displayed to the user. Until this error is interactively corrected, system 10 will not return from operation according to WZFORMS 122.

Upon return from the screen services modules, data processing system resets the signals of Status data structure 700 to indicate no integrity-level error, and returns to Interactive module 706. At this time, signals representing the actuated PF key 204 on keyboard 20 are present in qry.oper.

Operating further according to Interactive module 706, data processing system 10 tests the signals representing the operation selection by the interactive user (input by an actuated PF key 204). Certain operations (scrolling of the display, skip, retry, continue and others not pertinent here) can be carried out by data processing system 10, operating according to Interactive module 706; for others, data processing system 10 must return to a previous module.

Operation according to WZFETCH will now be described. Referring now to FIG. 26, apart from the descend operation which is not discussed herein, the context in which data processing system 10 operates according to WZFETCH is most commonly that in which a modified cursor has been created during a previous operation of the data processing system according to the relational operator described above. The modified cursor specifies a result relation of record occurrences. Further, the interactive user has actuated a PF key 204 on keyboard 20, effective to select one of the transition operations that cannot be handled by system 10 operating according to the WZDISP, WZSELECT, or WZPXI modules of FIG. 26. Specifically, such operations are transitions to the Add, Modify or Delete screen formats 166, or a descend transition to display of related record occurrences, as described above.

In operation, in this context, data processing system 10 returns to DO PXI module within the PACE RUN or other calling program; signals representing a modified cursor and a selected operation are present in working storage.

Operating according to DO PXI module 112, data processing system 10 tests the signals representing the selected operation. If the operation is a descend, this is handled as previously described. If the action is a transition to the Add, Modify or Delete screen formats, DO PXI calls DO UPDATE module 126, still within PACE RUN or other calling program.

The Add screen case will not be described in detail herein. Briefly, a default Add screen may be advantageously defined interactively by the user, in which certain open fields are displayed with characterizing information therein. For this purpose, system 10 operates according to WZFETCH but instead of retrieving a record occurrence from database 150, retrieves a default record containing the default characterizing information.

For the Modify or Delete screen formats 166, data processing system 10 operating according to DO UPDATE module 126 calls WZFETCH.

If the transition to a Modify or Delete screen was selected by the user while viewing a Display screen format 166, which displays a representation of a single record occurrence, then data processing system 10 will operate according to WZFETCH to obtain that record occurrence for display according to the Modify or Delete screen format. The Modify or Delete screen format is employed by data processing system 10, operating according to Interactive module 706; the representation of the record occurrence is displayed to the user. For a Modify operation, the user can interactively modify 45 fields of the represented record occurrence, and actuate Enter key 206 to select the operation of modification of the corresponding record occurrence signals in the database. (Note that modifying the representation does not in itself modify the physical records in the database, which must be accomplished in a separate operation, after validation, as will be described.) Alternatively, the user can actuate PF key 204-1 to Skip Record, or can actuate Return PF key 204-16.

Data processing system 10 then returns to DO UPDATE module 126, which calls WZUPDATE module 115. For purposes of the present description, WZUPDATE module 115 is assumed to provide means for accomplishing both Modify and Delete operations. Operating according to module 126, data processing system 10 accesses signals comprising integrity constraints from Data Dictionary attribute storage 520 (advantageously such signals have previously been copied into working storage). Data processing system 10 employs such integrity constraint signals together with signals representing user input (operation selection, with record occurrence modification for a Modify operation) to check the validity of the selected operation. The signals in the Program Buffer 703 comprise the record occurrence with respect to which the operation will be carried out.

If the selected operation is not valid, it is not performed; however, signals representing the error condition are generated by system 10 and stored in Status data structure 700 in TCOM 160, after which system 10 returns to DO UPDATE. The kind of error that is detected at this time has been previously described, with the example of an attempt to delete a parent record occurrence to which child record occurrences are related by a relationship, when the relationship attributes 520 prohibit such deletion.

Additionally and advantageously, other errors are also detected at this time. For example, a particular record occurrence may be "locked" (unavailable because another interactive user is operating with respect to it, through another terminal), so that the operation, although valid, cannot be performed at this time; it may be desired to retry the operation after a brief time interval.

If the operation is valid and can be performed, system 10 operating according to module WZUPDATE performs the operation and returns to DO UPDATE.

Data processing system 10, operating according to DO UPDATE module 126, tests the signals comprising Status data structure 700. If these signals represent an error, DO UPDATE calls WZFETCH. Operating according to WZFETCH, as has been described, system 10 also tests the Status data structure, and in response to an error condition, copies the signals comprising the previously retrieved record occurrence from System Buffer 168 (where they were placed when initially retrieved during the previous WZFETCH operation) to the Program Buffer 703. The screen services modules are called, as previously described, to control display 18 to display the previously retrieved record occurrence, together with an error message from Message File 702. Advantageously, the field or fields which were in error are flashed in the display.

The interactive user can read the error message and correct the entry. When the user has actuated either the Enter key or one of the PF keys 204-1 or 204-16, system 10 returns from opeation according to WZFETCH to DO UPDATE module 126. Module 126 calls WZ UPDATE module 115 as before described; system 10 validates the selected operation (and the modified record occurrence signals for a Modify operation) and if the error has been corrected, carries out the selected operation.

System 10 can at this time return to, for example, DO PXI for display of record occurrences on a DISPLAY screen.

The $errors-only parameter is employed in the following manner. In some cases it may be desired to offer a selectable operation to the interactive user such as "Delete All", in which a plurality of record occurrences (defined advantageously by a result relation provided in a previous operation) are all to be deleted from database 150. The user has no need to view each record occurrence before it is deleted, if the operation is valid with respect to that record occurrence; however, if the operation is invalid as to any one of the record occurrences, it is desirable that the user be able to view that occurrence with an error message, so that the operation can be corrected or skipped as to that record, and the operation can proceed as to remaining records. Alternatively, as described above, it may happen in a data processing system in which many interactive users are accessing the record occurrences in database 150 during the same time, that a particular record occurrence cannot be retrieved at a particular moment. In such a case, it is desirable to permit the interactive user to select a Retry operation, which if successful, will permit the system to continue operation.

For this purpose, DO UPDATE module 126 calls WZ FETCH module 602 and WZ UPDATE module 115 alternately until the selected operation has been carried out with respect to all record occurrences specified by the cursor. Signals representing a "yes" value of the $errors-only parameter are employed by system 10 when operating according to WZFETCH module 602. In response to such signals, when operating according to Main module 704, system 10 employs the signals comprising the Status structure in TCOM 160. If the value represented by these signals indicates that there has been no error in carrying out the selected operation on the previously retrieved record occurrence, system 10 operates according to Non-interactive module 708 to retrieve the next record occurrence, place signals comprising it into the Program Buffer, and increment the qry.fch-pos signals 707. The operation will then be validated with respect to the newly fetched record occurrence.

However, if the signals comprising the Status structure 700 indicate an error condition from the previous operation of system 10 according to WZ UPDATE 115, then system 10 operating according to Main module 704 will call Interactive module 706. As described above, the signals comprising the previously retrieved record occurrence will be copied to Program Buffer 703, and the screen services modules will control display 18 to display representations of such record occurrence and an error message from File 702, according to the format 166 specified by screen#.

Upon input of signals by the interactive user including an operation selection signals, system 10 clears Status structure 700 of the indication of the previously detected integrity level error and returns to DO UPDATE, which calls WZ UPDATE module 115. If the interactive user's signals have corrected the error (or selected Retry or Skip, or other appropriate operations) the system can perform the appropriate action, and continue with operation according to the remaining record occurrences. If not, system 10 again fails to validate the operation, and places appropriate signals in Status structure 700. No return to DO PXI or other calling program is possible until the error has been corrected. Thus no part of DO PXI or other calling program need provide means for handling such errors.

It will be observed that the means and operation according to my invention provide particularly convenient means for an interactive user to correct input errors in a large number of cases. The detection of the error, and the interactive means for correcting it, are provided for in the query-access level of the operation of the data processing system. This offers particular advantages when a programmer is constructing an interactive database maintenance program comprising other operations to be performed upon the database record occurrences, which employ Modify or Delete operations, as the programmer need not be concerned with this level of error.

A particular embodiment of the present invention comprises particular data structure definitions and program modules, running on a Wang VS-100 (virtual storage) computer. Source code for the particular data structure declarations and program modules is provided in the accompanying microfiche appendix.

What is claimed is:

1. For use in a relational database management system, interactive error-handling means, comprising
   display means and input means,
   storage means providing: record occurrence signals comprising record occurrences in a relational database; status signals; currency signals; format signals; and message file signals representing the characters of displayable error message; and providing means defining an operation buffer and first and second record occurrence buffers,
   calling means,
   operation means, and
   fetch means,
   said operation means comprising:
      means responsive to an operation call signal for validating an operation selected to be performed with respect to record occurrence signals in said second record occurrence buffer and providing an output signal having one of two values, said values representing valid and invalid conditions,
      means responsive to a said invalid condition value of said output signal for generating corresponding status invalid signals, and providing an operation return signa,
      means responsive to a said valid condition value of said output signal for performing said selected operation with respect to said record occurrence signals, and providing an operation return signal,
   said fetch means comprising:
      noninteractive means responsive to a fetch call signal, a noninteractive condition, and said currency signals for retrieving record occurrence signals from said database, for placing said retrieved signals into said first and second buffers, for incrementing said currency signals, and for providing a fetch return signal, and
      interactive means responsive to a fetch call signal and an interactive condition signal, and comprising
         means responsive to said status valid signals and to said currency signals for retrieving said record occurrence signals from said database, and for copying said retrieved signals into said first and second buffers, and
         means responsive to said status invalid signals for copying said record occurrence signals from said first to said second buffer, and
         display means responsive to said format signals and to said signals in said second buffer for controlling said display to display a representation of said record occurrence, and responsive to operator input signals from said input means, for placing an operation selection signal in said operation buffer, and providing a fetch return signal,
         said display means being further responsive to said status invalid signals and said message signals for displaying representations of a said error message with said record occurrence representation, and
   said calling means being responsive to said operation return signals and to said status invalid signal for providing a fetch means call signal, and responsive to said fetch return signal for providing an operation call signal.

2. The error-handling means of claim 1, wherein said display means is further responsive to operator input signals to modify said signals in said second buffer.

3. The error-handling means of claim 1, wherein
said fetch means further comprises condition means responsive to a format identifier signal, to a first value of a condition parameter signal, and to said status invalid signal to provide a said interactive condition signal, and
responsive to a format identifier signal, to a first value of a condition parameter signal, and to said status valid signal to provide a said noninteractive condition signal.

4. A data processing system having: input means for providing input signals; a visual display; storage means providing signals representing a plurality of record occurrences organized as relations within a relational database; working storage; and a processor having means for controlling said visual display, for reading and writing said working storage, and for responding to said input signals, and access means for retrieving record occurrence signals from said database and for storing retrieved record occurrence signals in said working storage, characterized in having
means in said working storage for providing format signals representative of predefined LIST, DISPLAY and SELECT mode display formats, said format signals including mode indicators each corresponding to a said mode display format; and cursor signals representative of a cursor defined against a target comprising at least one of said relations in said database; and
relational operator means for providing signals representative of a result relation defined interactively through said input means, said operator means comprising:
cursor acceptance means for accepting from said working storage said cursor signals, said system access means being responsive to said cursor acceptance means and to signals derived from said LIST mode indicator to retrieve from said target, record occurrence signals specified by said cursor,
screen image defining means
responsive to said LIST mode indicator for accepting from said working storage said LIST mode format signals, and for defining and storing LIST mode screen image signals representative of a LIST mode screen image, responsive to said LIST mode format signals and to said retrieved record occurrence signals,
responsive to said DISPLAY mode indicator for accepting from said working storage said DISPLAY mode format signals, and for defining and storing screen image signals representative of a screen image, responsive to said DISPLAY mode format signals and said retrieved record occurrence signals,
responsive to said SELECT mode indicator for accepting from said working storage said SELECT mode format signals, and for defining and storing responsive thereto screen image signals representative of a screen image providing generic elements and open elements,
responsive to said predefined display format signals to define in a said screen image, representations of a plurality of selectable operations executable by said processor, a said plurality of said selectable operations being defined for each said mode format,
said plurality of selectable operations
defined for said LIST mode format including a transition operation from display according to said LIST mode format to display according to said SELECT mode format, and a transition operation from display according to said LIST mode format to display according to said DISPLAY mode format,
defined for said SELECT mode format including a transition operation from display according to said SELECT mode format to display according to said LIST mode format, and
defined for said DISPLAY mode format including a transition operation from display according to said DISPLAY mode format to display according to said LIST mode format,
said processor being responsive to said operator means
to control said display to display a representation of a said stored screen image, and to modify said stored screen image signals corresponding to signals from said input means, input during such display, and
to accept, during such display, operation selection signals from said input means, effecting selection of one of the said plurality of operations defined for said display format, said processor storing said operation selection signals,
said operator means further comprising
means for deriving from said modified LIST mode screen image signals together with said cursor signals, output signals defining a result relation, membership in which is defined enumeratively,
means for deriving from said modified SELECT mode screen image signals together with said cursor signals, output signals defining a result relation, membership in which is defined characteristically, and
means for storing said output signals in said working storage,
said operator means further providing
means responsive to said stored operation selection signals for providing and storing an output signal representative of said selected operation,
means responsive to a said output signal representative of said transition operation from LIST to DISPLAY to provide a said DISPLAY mode indicator to said screen image defining means,
means responsive to a said output signal representative of said transition operation from DISPLAY to LIST to provide a LIST mode indicator to said screen image defining means,
means responsive to said output signal representative of said transition operation from LIST to SELECT to provide signals representative of said SELECT mode indicator to said screen image defining means, and
means responsive to said output signal representative of said transition operation from SELECT to LIST to provide signals representative of said LIST mode indicator to said screen image defining means and to said cursor acceptance means, said cursor acceptance means being thereafter responsive to said modified cursor signals to retrieve record occurrence signals from said target.

5. The data processing system of claim 4, further characterized in that
said working storage further provides means for providing format signals representative of a predefined UPDATE display format, and
said plurality of selectable operation defined for each of said LIST, DISPLAY and SELECT display formats includes a transition operation to display according to said UPDATE display format signals,
said data processing system further providing update means responsive to said operator means output signal representing said transition to UPDATE display, and to said output signals defining a result relation, for executing said update operation on said database record occurrences, said update means providing
means for accessing said UPDATE display format signals and for defining and storing screen image signals representative of an UPDATE screen image having representations of a said enumerated record occurrence and a selectable update operation performable on said record occurrence,
said processor being responsive to said update means to control said display to display a representation of said stored UPDATE screen image signals and to receive and store an update operation selection signal input from said input means,
said update means further providing means responsive to said stored update operation selection signal to execute said update operation on said enumerated record occurrence.

6. A data processing system having: input means providing input signals; a visual display; storage means providing signals representing a plurality of record occurrences organized as relations within a relational database; working storage; and a processor having means for controlling said visual display, for reading and writing said working storage, and for responding to said input signals, and access means for retrieving record occurrence signals from said database and for storing retrieved record occurrence signals in said working storage,
characterized in having
means in said working storage for providing format signals representative of a predefined display format and cursor signals representative of a cursor defined against a target comprising at least one of said relations in said database, and
relational operator means for providing signals representative of a result relation, membership in said result relation being defined enumeratively and interactively through said input means, said operator means comprising:
cursor acceptance means for accepting from said working storage said cursor signals, said system access means being responsive to signals from said cursor acceptance means to retrieve from said target record occurrence signals specified by said cursor;
screen image defining means for accepting from said working storage said format signals, and for defining and storing screen image signals representative of a screen image, responsive to said format signals and to said stored retrieved record occurrence signals,
said processor being responsive to said operator means to control said display to display a representation of said stored screen image signals, and to modify said stored screen image signals corresponding to enumerating signals from said input means, input during such display, effecting enumeration of certain of said retrieved record occurrences,
said operator further comprising means for deriving from said modified screen image signals together with said cursor signals, output signals defining a result relation, membership in which is defined enumeratively, and for storing said output signals in said working storage.

7. The data processing system of claim 5, further characterized in that
said operator screen image defining means is further responsive to said predefined display format signals to define in said screen image representations of a plurality of selectable operations executable by said processor,
said processor being responsive to said operator means to accept, during such display, operation selection signals input from said input means, effecting selection of one of said defined plurality of operations, said processor storing said operation selection signals,
said operator means further providing means responsive to said stored operation selection signals for providing and storing an output signal representative of said selected operation.

8. A data processing system having: input means providing input signals; a visual display; storage means providing signals representing a plurality of record occurrences organized as relations within a relational database; working storage; and a processor having means for controlling said visual display, for reading and writing said working storage, and for responding to said input signals, and access means for retrieving record occurrence signals from said database and for storing retrieved record occurrence signals in said working storage,
characterized in having
means in said working storage for providing format signals representative of a predefined display format, and cursor signals representative of a cursor defined against a target comprising at least one of said relations in said database, and
relational operator means for providing signals representative of a result relation, membership in said result relation being defined in terms of record occurrence attributes explicitly defined in said database, said result relation being defined interactively through said input means, said operator means comprising:
screen image defining means for accepting said format signals from said working storage, and for defining and storing signals representative of a screen image providing generic elements and open elements,
said processor being responsive to said operator means to control said display to display a representation of said screen image, and to modify said stored screen image open elements responsive to characterizing signals from said input means, input during such display, effecting characterization of said cursor, said operator further comprising means for deriving from said modified screen image together with said cursor signals, output signals defining a modified cursor which defines a result relation, membership in which is defined characteristically, and for storing said output signals in said working storage.

9. The data processing system of claim 8, further characterized in that said operator screen image defining means is further responsive to said predefined display format signals to define in said screen image representations of a plurality of selectable operations executable by said processor, said processor being responsive to said operator means to accept, during such display, operation selection signals input from said input means, effecting selection of one of said defined plurality of operations, said processor storing said operation selection signals, said operator means further providing means responsive to said stored operation selection signals for providing and storing an output signal representative of said selected operation.

10. A data processing system having: input means providing input signals; a visual display; storage means providing signals representing a plurality of record occurrences organized as relations within a relational database; working storage; and a processor having means for controlling said visual display, for reading and writing said working storage, and for responding to said input signals, and access means for retrieving record occurrence signals from said database and for storing retrieved record occurrence signals in said working storage, characterized in having means in said working storage for providing format signals representative of predefined first and second mode display formats, said format signals including first and second mode indicators corresponding to said first and second mode display formats respectively; and cursor signals representative of a cursor defined against a target comprising at least one of said relations in said database; and relational operator means for providing signals representative of a result relation defined interactively through said input means, said operator means comprising:

cursor acceptance means for accepting from said working storage said cursor signals, said system access means being responsive to said cursor acceptance means and to signals derived from said first mode indicator to retrieve from said target record occurrence signals specified by said cursor, screen image defining means responsive to said first mode indicator for accepting from said working storage said first mode format signals, and for defining and storing first mode screen image signals representative of a first mode screen image, responsive to said first mode format signals and to said retrieved record occurrence signals, said processor being responsive to said operator means to control said display to display a representation of said first mode screen image, and to modify said stored first mode screen image signals corresponding to enumerating signals input from said input means during such display, said screen image defining means being responsive to signals derived from said second mode indicator for accepting from said working storage said second mode format signals, and for defining and storing second mode screen image signals representative of a second mode screen image providing generic elements and open elements, said processor being responsive to said operator means to control said display to display a representation of said second mode screen image, and to modify said stored second mode screen image open elements responsive to characterizing signals input from said input means during such display, effecting characterization of said cursor, said operator means further comprising means for deriving from said modified first mode screen image signals together with said cursor signals, output signals defining a result relation, membership in which is defined enumeratively;

means for deriving from said modified second mode screen image signals together with said cursor signals, output signals defining a result relation, membership in which is defined characteristically;

and means for storing said output signals in said working storage.

11. The data processing system of claim 10, further characterized in that said operator means screen image defining means is further responsive to said predefined display format signals to define in a said screen image, representations of a plurality of selectable operations executable by said processor, a said plurality of said selectable operations being defined for each said mode format, said processor being responsive to said operator means to accept, during such display of a said screen image, operation selection signals input from said input means, effecting selection of one of the said plurality of operations defined for said display format, said processor storing said operation selection signals, said operator means further providing means responsive to said stored operation selection signals for providing and storing an output signal representative of said selected operation.

12. The data processing system of claim 11, further characterized in that said plurality of selectable operations defined for said first mode format includes a transition operation from display according to said first mode format to display according to said second mode format, said operator means further including means responsive to said output signal representative of said transition operation to provide signals representative of said second mode indicator to said screen image defining means.

13. The data processing system of claim 11, further characterized in that said plurality of selectable operations defined for said second mode format includes a transition operation from display according to said second mode format to display according to said first mode format, said operator means further including means responsive to said output signal representative of said transition operation to provide signals representative of said first mode indicator to said screen image defining means and to said cursor acceptance means, said cursor acceptance means being thereafter responsive to said modified cursor signals to retrieve record occurrence signals from said target.

14. The data processing system of claim 6, further characterized in that said working storage provides first and second buffer locations, said format signals including signals representative of first and second mode predefined display formats, said format signals including first and second mode indicators corresponding to said first and second mode display formats respectively, and a screen limit signal associated with said first mode display format, said system access means being responsive to said cursor acceptance means and to said screen image defining means to retrieve from said target record occurrence signals specified by said cursor and to store said record occurrence signals in said first buffer location, said screen image defining means being responsive to said first mode indicator for successively moving successively retrieved said record occurrence signals from said first buffer location to said second buffer location and for controlling said system access means to retrieve further record occurrence signals until a plurality of said record occurrence signals are provided in said second buffer location, said plurality being defined by said screen limit signal, said screen image defining means being thereafter responsive to said first mode indicator for accepting from said working storage said first mode format signals, and for defining and storing screen image signals representative of a screen image, responsive to said first mode format signals and to said stored plurality of retrieved record occurrence signals in said second buffer location, said screen image defining means being responsive to said second mode indicator for accepting from said working storage said second mode format signals, and for defining and storing screen image signals representative of a screen image, responsive to said second mode format signals and to said retrieved record occurrence signals in said first buffer location.

15. The data processing system of claim 14, further characterized in that said operator means screen image defining means is further responsive to said predefined display format signals to define in a said screen image, representations of a plurality of selectable operations executable by said processor, a said plurality of said selectable operations being defined for each said mode format, said processor being responsive to said operator means to accept, during such display, operation selection signals input from said input means, effecting selection of one of said defined plurality of operations, said processor storing said operation selection signals, said operator means further providing means responsive to said stored operation selection signals for providing and storing an output signal representative of said selected operation.

16. The data processing system of claim 7, further characterized in that said working storage further provides means for providing format signals representative of a predefined update display format, said plurality of selectable operations including a transition to display according to said update display format signals, said data processing system further providing update means responsive to said operator means output signal representing said transition operation, and to said output signals defining a result relation, for executing said update operation on said database record occurrences, said update means providing means for accessing said update display format signals and for defining and storing screen image signals representative of a screen image having representations of a said enumerated record occurrence and a selectable update operation performable on said record occurrence, said processor being responsive to said update means to control said display to display a representation of said stored screen image signals and to receive and store an update operation selection signal input from said input means, said update means further providing means responsive to said stored update operation selection signal to execute said update operation on said enumerated record occurrence.

17. The data processing system of claim 7, further characterized in that said format signals include signals representative of first and second mode predefined display formats, said format signals including first and second mode indicators corresponding to said first and second mode display formats respectively, said screen image defining means being responsive to said first mode indicator for accepting from said working storage said first mode format signals, and for defining and storing screen image signals representative of a screen image, responsive to said first mode format signals and to said stored retrieved record occurrences, said screen image defining means being responsive to said second mode indicator for accepting from said working storage said second mode format signal, and for defining and storing screen image signals representative of a screen image, responsive to said second mode format signals and said stored retrieved record occurrences, said screen image defining means being further responsive to said predefined display format signals to define in a said screen image, representations of a plurality of selectable operations executable by said processor, a said plurality of said selectable operations being defined for each said mode format, said plurality of selectable operations for said first mode format including a transition operation from display according to said first mode format to display according to said second mode format, said plurality of selectable operations for second second mode format including a transition operation from display according to said second mode format to display according to said first mode format, said processor being responsive to said operator means to accept, during such display, operation selection signals input from said input means, effecting selection of one of said defined plurality of operations, said processor storing said operation selection signals, said operator means further providing means responsive to said stored operation selection signals for providing and storing an output signal representative of said selected operation, said operator means further providing means responsive to a said stored transition operation selection output signal to provide a corresponding said mode indicator to said screen image defining means.

18. A data processing system having input means and display means, storage providing stored signals representative of record occurrences modeled as a set of relations, storage means and access means for storing and retrieving said record occurrence signals, and first operator means for operating upon retrieved signals representative of at least one operand relation of said set to produce a result relation, defined by at least one of the operators Union, Intersection, Difference, Select, Project, and Join, and for controlling said storage means to store signals representative of said result relation in said storage, said set being closed under said defined operation, said data processing system being characterized by having, second operator means responsive to cursor signals for controlling said access means to retrieve signals representative of an operand relation defined by said cursor, and for controlling said display means to display a representation of said relation, said second operator means being thereafter responsive to enumerating actuation of said input means, during said display, for defining an enumerated result relation derived from said displayed relation, and for controlling said storage means to store signals representative of said enumerated result relation in said storage, said enumerated result relation being a member of said set and said set being closed under said enumerative operation.

19. A data processing system having user input means and display means, storage providing stored signals representative of record occurrences modeled as a set of relations, each said record occurrence comprising at least one attribute, and first operator means for operating upon signals representative of at least one operand relation of said set to produce a result relation, defined by at least one of the operators Union, Intersection, Difference, Select, Project, and Join, and for storing signals representative of said result relation in said storage, said set being closed under said operation, said data processing system being characterized in that said storage further provides stored screen image signals representative of a screen image and associated stored cursor signals representative of a cursor, both defined with respect to a target relation, said screen image providing unmodifiable elements and modifiable attribute elements, said data processing system further having second operator means for controlling said display means to display a representation of a said stored screen image, said second operator means being thereafter responsive to characterizing actuation of said input means, during said display, for modifying said stored screen image modifiable elements, and for effecting corresponding characterization of said associated stored cursor to provide a modified cursor, said modified cursor defining a relation which is a member of said set.

* * * * *